US010457102B2

(12) United States Patent
Taniguchi

(10) Patent No.: US 10,457,102 B2
(45) Date of Patent: Oct. 29, 2019

(54) PNEUMATIC TIRE

(71) Applicant: TOYO TIRE & RUBBER CO., LTD., Osaka-shi, Osaka (JP)

(72) Inventor: Jiro Taniguchi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 271 days.

(21) Appl. No.: 15/273,109

(22) Filed: Sep. 22, 2016

(65) Prior Publication Data

US 2017/0096034 A1 Apr. 6, 2017

(30) Foreign Application Priority Data

Oct. 6, 2015 (JP) .................................. 2015-198703
Oct. 6, 2015 (JP) .................................. 2015-198704
Oct. 6, 2015 (JP) .................................. 2015-198707

(51) Int. Cl.
  *B60C 11/13* (2006.01)
  *B60C 11/03* (2006.01)
  *B60C 11/12* (2006.01)

(52) U.S. Cl.
  CPC ...... *B60C 11/0304* (2013.01); *B60C 11/0302* (2013.01); *B60C 11/0306* (2013.01);
  (Continued)

(58) Field of Classification Search
  CPC ......... B60C 11/1369; B60C 2011/0355; B60C 2011/0367; B60C 11/0302;
  (Continued)

(56) References Cited

U.S. PATENT DOCUMENTS 6,527,023 B1 3/2003 Takahashi
2010/0186861 A1* 7/2010 Ishiguro .............. B60C 11/0306
  152/209.25
(Continued)

FOREIGN PATENT DOCUMENTS

CN 103182903 A 7/2013
EP 2095976 A2 9/2009
(Continued)

OTHER PUBLICATIONS

Office Action dated Mar. 8, 2018, issued in counterpart German Application No. 102016117816.0, with English translation. (16 pages).
(Continued)

*Primary Examiner* — Eric Hug
(74) *Attorney, Agent, or Firm* — Westerman, Hattori, Daniels & Adrian, LLP

(57) ABSTRACT

Groove widths of center main grooves are larger than groove widths of inner and outer main grooves. Plurality of lateral grooves are formed at intervals in a tire circumferential direction so as to define inner shoulder blocks belonging to an inner shoulder row. A first raised portion connecting a pair of inner shoulder blocks to each other is formed in the lateral grooves every one other on an inner main groove side. A depth of the lateral groove in the first raised portion is smaller than the depth of the lateral groove in other portions. A second raised portion is formed on the outer main groove in a region defined by an imaginary line connecting an outer intermediate block and an outer shoulder block. A depth of the outer main groove in the second raised portion is smaller than that of the outer main groove in other portions.

7 Claims, 26 Drawing Sheets

(52) U.S. Cl.
CPC ........ *B60C 11/0309* (2013.01); *B60C 11/125* (2013.01); *B60C 11/1259* (2013.01); *B60C 11/1272* (2013.01); *B60C 11/1369* (2013.01); *B60C 2011/0341* (2013.01); *B60C 2011/0353* (2013.01); *B60C 2011/0355* (2013.01); *B60C 2011/0367* (2013.01); *B60C 2011/0369* (2013.01); *B60C 2011/0388* (2013.01); *B60C 2011/1213* (2013.01)

(58) Field of Classification Search
CPC ............. B60C 11/0304; B60C 11/0306; B60C 11/0309; B60C 2011/0337; B60C 2011/0341; B60C 2011/0353; B60C 2011/0369
USPC .......................... 152/209.18, 209.22, 209.25
See application file for complete search history.

(56) References Cited

U.S. PATENT DOCUMENTS

| | | | |
|---|---|---|---|
| 2012/0103492 A1 | 5/2012 | Knispel | |
| 2013/0020001 A1* | 1/2013 | Nishi | B60C 11/0306 152/209.18 |
| 2013/0167995 A1 | 7/2013 | Hada | |
| 2013/0312888 A1 | 11/2013 | Sugiyasu et al. | |
| 2014/0360640 A1* | 12/2014 | Fujioka | B60C 11/0306 152/209.18 |
| 2015/0007917 A1 | 1/2015 | Tanaka | |
| 2015/0151585 A1 | 6/2015 | Fujioka | |

FOREIGN PATENT DOCUMENTS

| | | |
|---|---|---|
| JP | H05-178031 A | 7/1993 |
| JP | 6-227213 A | 8/1994 |
| JP | 2001-219712 A | 8/2001 |
| JP | 3376342 B2 | 2/2003 |
| JP | 2005-14859 A | 1/2005 |
| JP | 4718294 B2 | 7/2011 |
| JP | 2012-96782 A | 5/2012 |
| JP | 5528208 B2 | 6/2014 |
| JP | 5639461 B2 | 12/2014 |
| JP | 2015-013513 A | 1/2015 |
| JP | 2015-044512 A | 3/2015 |
| JP | 2015-107712 A | 6/2015 |
| WO | 2011/087134 A1 | 7/2011 |
| WO | 2012/111589 A1 | 8/2012 |

OTHER PUBLICATIONS

Office Action dated Nov. 5, 2018, issued in counterpart Chinese Application No. 201610873770.6, with English machine translation. (13 pages).

Office Action dated May 14, 2019, issued in counterpart JP application No. 2015-198703, with English translation.(6 pages).

Office Action dated May 28, 2019, issued in counterpart JP application No. 2015-198704, with English translation. (8 pages).

* cited by examiner

Fig.12
COMPARATIV EX.3
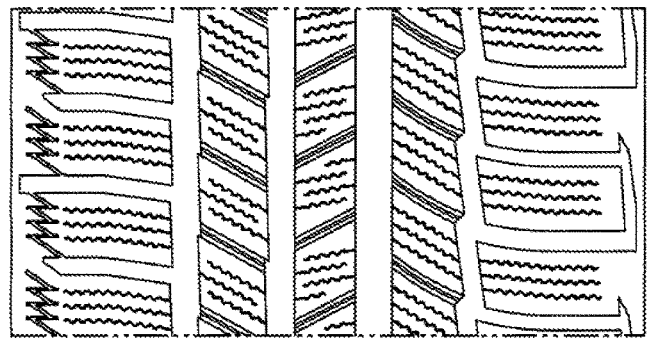
COMPARATIV EX.4
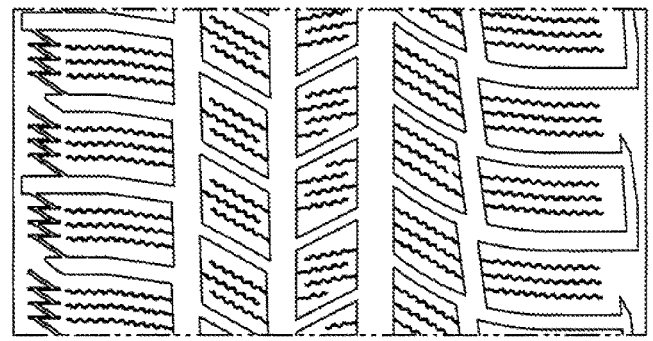
COMPARATIV EX.5
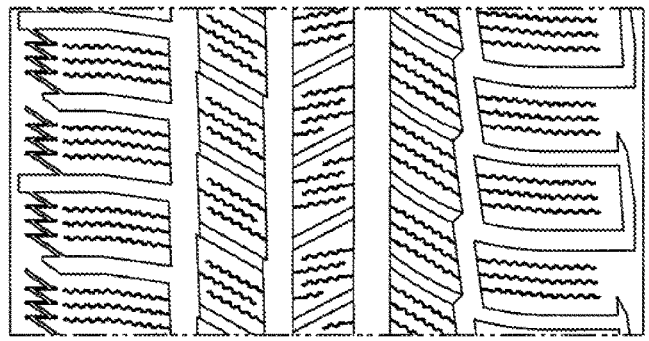
COMPARATIV EX.6
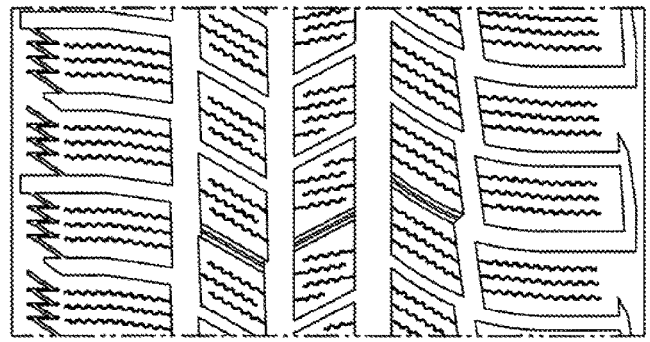

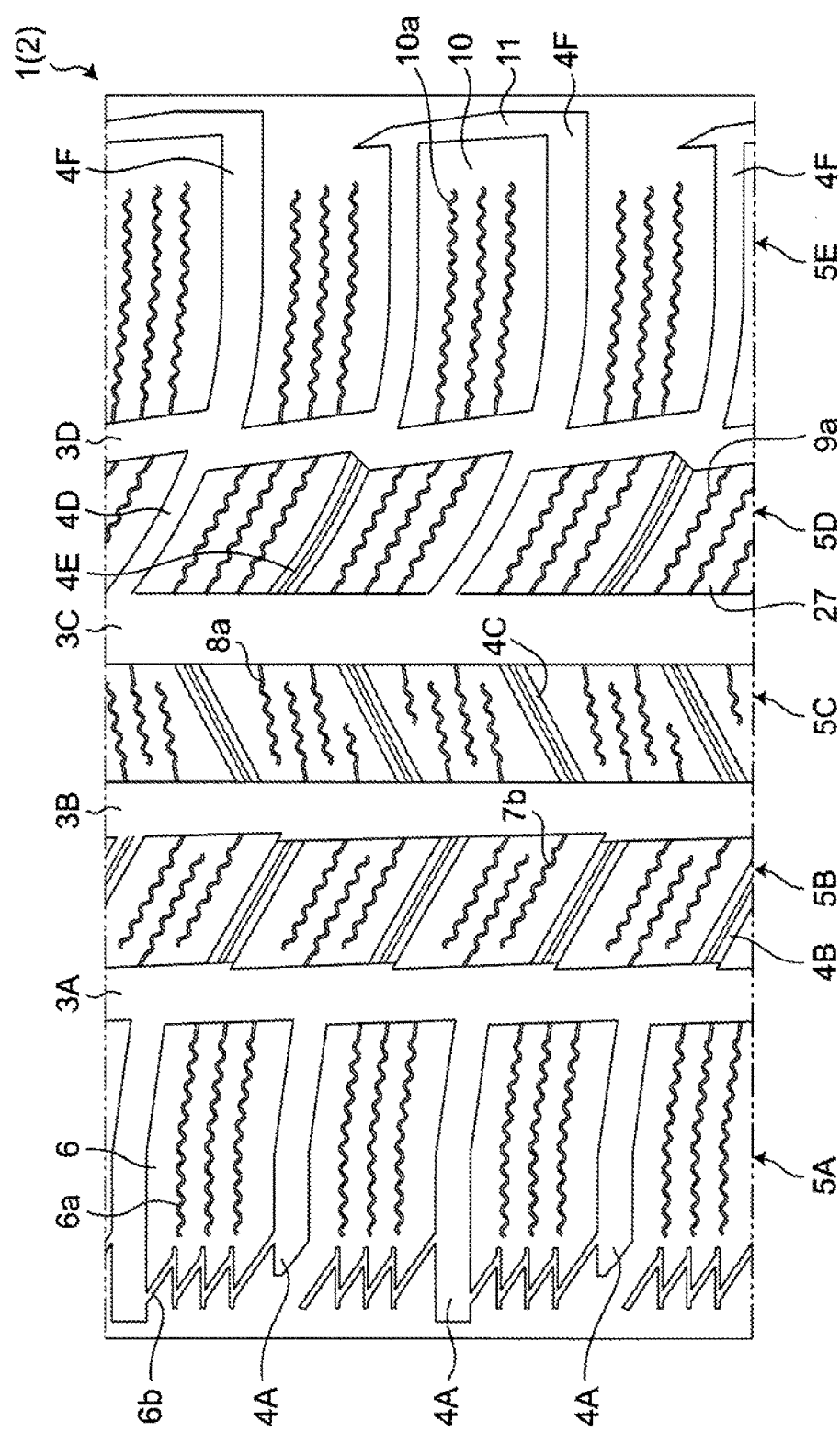

PNEUMATIC TIRE

CROSS-REFERENCE TO RELATED APPLICATIONS

This application claims priority of Japanese Patent Application Nos.: 2015-198703, 2015-198704, and 2015-198707 filed on Oct. 6, 2015, the contents of which are incorporated herein by reference.

BACKGROUND OF THE INVENTION

Technical Field
The present invention relates to a pneumatic tire.
Related Art
WO 2012/111589, Japanese Patent 5639461, Japanese Patent 3376342 and JP 2012-96782 A disclose a pneumatic tire having a plurality of block rows extending in a tire circumferential direction. Each block row has a plurality of blocks arranged in a row in the tire circumferential direction. However, it is not always the case with these conventional pneumatic tires that the pneumatic tire has succeeded in enhancing all of the following: drive performance, braking performance and turning performance while ensuring drain performance.

There have been proposed tires having various tread patterns for the purpose of enhancing motion performances (acceleration, braking, turning and the like) on a dry road surface (a road surface on which no rain or snow has fallen) and a snowy road surface (snowy road).

For example, on a tread surface of a tire disclosed in Japanese Patent 5528208, shallow grooves each having recessed portions (sipes) formed on a groove bottom are formed on a rib formed between two main grooves disposed adjacently to each other at predetermined intervals. With such a configuration, a ground contact area can be reduced and hence, road noises can be reduced.

In Japanese Patent 4718294, in a shoulder region, sipes are formed on a bottom of a lug groove. The sipes arranged on the groove bottom are minimally erased even when the pneumatic tire is used for a long period and hence, on-snow performance obtained by the sipes can be maintained for a long period.

SUMMARY

It is a first object of the present invention to provide a pneumatic tire which can enhance drive performance, braking performance and turning performance while ensuring drain performance.

It is a second object of the present invention to provide a pneumatic tire which can enhance motion performances both on a dry road surface and on a snowy road surface.

A first aspect of the present invention corresponds to the first object. The first aspect of the present invention provides a pneumatic tire comprising: four main grooves formed on a tread portion such that the four main grooves extend in a tire circumferential direction; a plurality of lateral grooves formed on the tread portion; and five block rows each including a plurality of blocks defined respectively by the main grooves and a pair of the lateral grooves disposed adjacently to each other in the tire circumferential direction, the blocks arranged in a row in the tire circumferential direction, wherein a mounting posture of a pneumatic tire with respect to a vehicle body in a tire width direction is designated, wherein the main grooves comprise: an inner main groove positioned on an innermost side in the tire width direction in a state where the tire is mounted on the vehicle; an outer main groove positioned on an outermost side in the tire width direction in a state where the tire is mounted on the vehicle; a first center main groove disposed adjacently to an outer side of the inner main groove in the tire width direction; and a second center main groove disposed adjacently to an inner side of the outer main groove in the tire width direction, wherein the block rows comprise: an inner shoulder row positioned inside the inner main groove in the tire width direction; an outer shoulder row positioned outside the outer main groove in the tire width direction; an inner intermediate row positioned between the inner main groove and the first center main groove; an outer intermediate row positioned between the outer main groove and the second center main groove; and a center row positioned between the first center main groove and the second center main groove, wherein a groove width of the first center main groove and a groove width of the second center main groove are larger than a groove width of the inner main groove and a groove width of the outer main groove, wherein the lateral, groove includes a plurality of first lateral grooves formed at intervals in the tire circumferential direction so as to define blocks belonging to the inner shoulder row, wherein a first raised portion which connects the pair of blocks belonging to the inner shoulder row to each other is formed in the first lateral grooves every one other on an inner main groove side, and a depth of the first lateral groove in the first raised portion is smaller than a depth of the first lateral groove in other portions, and wherein a second raised portion is formed on the outer main groove in a region defined by an imaginary line which connects the block belonging to the outer intermediate row and the block belonging to the outer shoulder row, and a depth of the outer main groove in the second raised portion is smaller than a depth of the outer main groove in other portions.

A first lateral groove is formed between the blocks which form the inner shoulder row. The first lateral groove allows the deformation of these blocks in a tire width direction so that rigidity in a longitudinal direction (tire circumferential direction) is lowered. However, by forming a first raised portion which connects the pair of blocks belonging to the inner shoulder row on the first lateral groove, it is possible to make these blocks deform integrally against the load in the longitudinal direction. That is, by forming the first raised portion, the rigidity in the longitudinal direction of the blocks which form the inner shoulder row is increased and hence, drive performance and braking performance on a dry road surface can be enhanced.

A camber angle is imparted to a pneumatic tire (hereinafter referred to as "tire") mounted on a vehicle. Accordingly, on a dry road surface, a shape of a ground contact region with a road surface has a tendency to extend in a tire circumferential direction at an inner portion of a tread portion in a tire width direction (particularly, at the time of braking). Accordingly, by increasing rigidity by connecting the blocks which form the inner shoulder row by the first raised portion, drive performance and braking performance on the dry road surface can be realized further effectively.

The first raised portion is formed on every other first lateral groove which constitutes a plurality of first lateral grooves. Accordingly, in the first lateral groove on which the first raised portion is not formed, the flow of water is not obstructed by the first raised portion and hence, priority is assigned to the ensuring of drain performance. That is, by forming the first raised portion on every other first lateral groove which constitutes a plurality of first lateral grooves, the tire can acquire both the ensuring of drain performance and the enhancement of drive performance and braking performance on a dry road surface.

One side of the block belonging to the outer intermediate row in the tire width direction is defined by the outer main groove. Both sides of the block belonging to the outer intermediate row in the tire circumferential direction are defined by the lateral grooves. These outer main grooves and lateral grooves allow the deformation of the blocks belonging to the outer intermediate row in the tire with direction and hence, the outer main grooves and the lateral grooves lower the rigidity of the block in the lateral direction (tire width direction). However, by connecting the block belonging to the outer intermediate row and the block belonging to the outer shoulder row to each other by the second raised portion, it is possible to make these blocks deformed integrally against a load in the lateral direction. That is, with the formation of the second raised portion, the rigidity of the blocks belonging to the outer intermediate row in the lateral direction can be enhanced and hence, steering performance or turning performance on a dry road surface can be enhanced.

The second raised portion is not formed on the entire outer main groove but is partially formed in the region defined by the imaginary line which connects the block belonging to the outer intermediate row and the block belonging to the outer shoulder row to each other. Accordingly, an effect which the second raised portion exerts on the flow of water in the outer main groove is limited and hence, drain performance is ensured.

A second aspect of the present invention corresponds to the second object. The second aspect of the present invention provides a pneumatic tire comprising: at least three main grooves extending in a tire circumferential direction and formed on a tread surface, wherein, between at least one pair of main grooves disposed adjacently to each other among the three main grooves, a plurality of blocks which are separated from a periphery by the main grooves and deep grooves are arranged in a row in the tire circumferential direction, and wherein all of the plurality of blocks are formed of a composite block where a surface is divided by one or a plurality of shallow groove with sipes which have the sipes on a groove bottom.

According to a pneumatic tire according to the second aspect of the present invention, the pneumatic tire can enhance snow performance while preventing lowering of dry performance by making use of characteristic of "composite block".

A third aspect of the present invention also corresponds to the second object. The third aspect of the present invention provides a pneumatic tire comprising and at least three main grooves extending in a tire circumferential direction and formed on a tread surface, wherein a rib positioned between a pair of main grooves positioned on an innermost side in a state where a tire is mounted on a vehicle is configured such that the rib is not divided into blocks by deep grooves, and a sipe or a shallow groove with sipes which has the sipes on a groove bottom is formed on a surface of the rib, wherein a plurality of blocks which are separated from a periphery by the main grooves and the deep grooves are arranged in a row in the tire circumferential direction in at least one of other regions each of which is disposed between the main grooves, and wherein all of the plurality of blocks are formed of a composite block where a surface is divided by one or a plurality of shallow grooves with sipes which have the sipes on a groove bottom.

First, among regions sandwiched between two main grooves, in a region between one pair of main grooves positioned on the innermost side in a state where a tire is mounted on a vehicle (a ground contact length in the tire circumferential direction being the longest in this region when a camber angle is taken into consideration), a rib is arranged. The rib is not divided into blocks by deep grooves, and the rib has sipes on a surface thereof or has a shallow groove with sipes which has the sipes on a groove bottom thereof.

Such a rib has high rigidity as a whole, and can increase a gripping force due to the sipes or the shallow groove with sipes formed on the surface of the rib. That is, by forming the rib having high rigidity and high gripping force in the region having a large ground contact length (inner intermediate region), the pneumatic tire can acquire high motion performance and braking performance on a dry road surface.

Further, the pneumatic tire can enhance snow performance while preventing lowering of dry performance by making use of characteristic of "composite block".

BRIEF DESCRIPTION OF THE DRAWINGS

The foregoing and the other features of the present invention will become apparent from the following description and drawings of an illustrative embodiment of the invention in which:

FIG. 12 is a set of developed views of tread patterns of tires according to comparative examples 3 to 6;

FIG. 13 is a developed view of a tread pattern of a tire according to a fifth embodiment of the present invention;

DETAILED DESCRIPTION OF EMBODIMENTS

An embodiment of the present invention is described with reference to attached drawings.

The first embodiment corresponds to the first aspect of the present invention.

Figure 1:
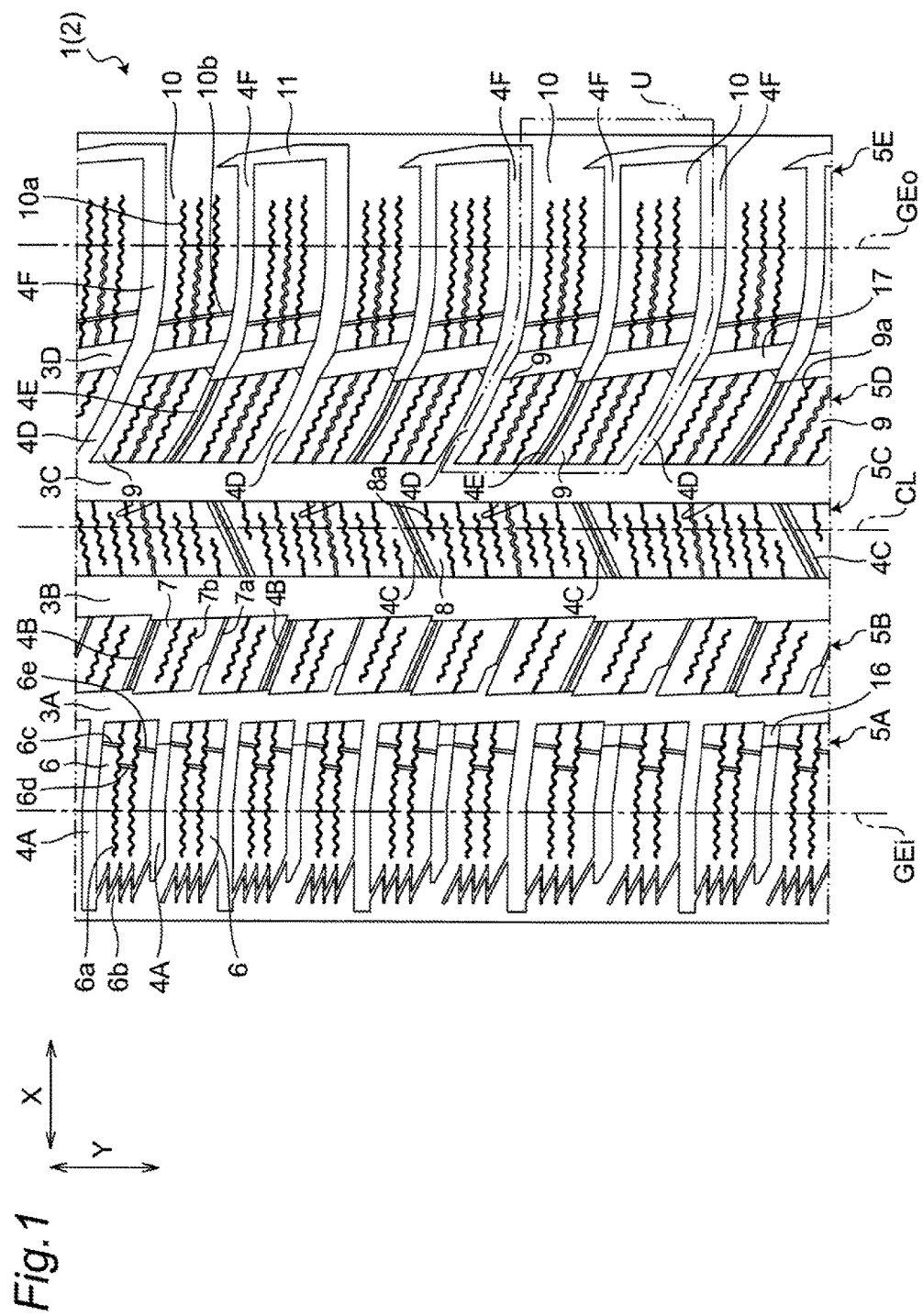
FIG. 1 is a developed view of a tread pattern of a tire according to a first embodiment of the present invention.
Figure 2:
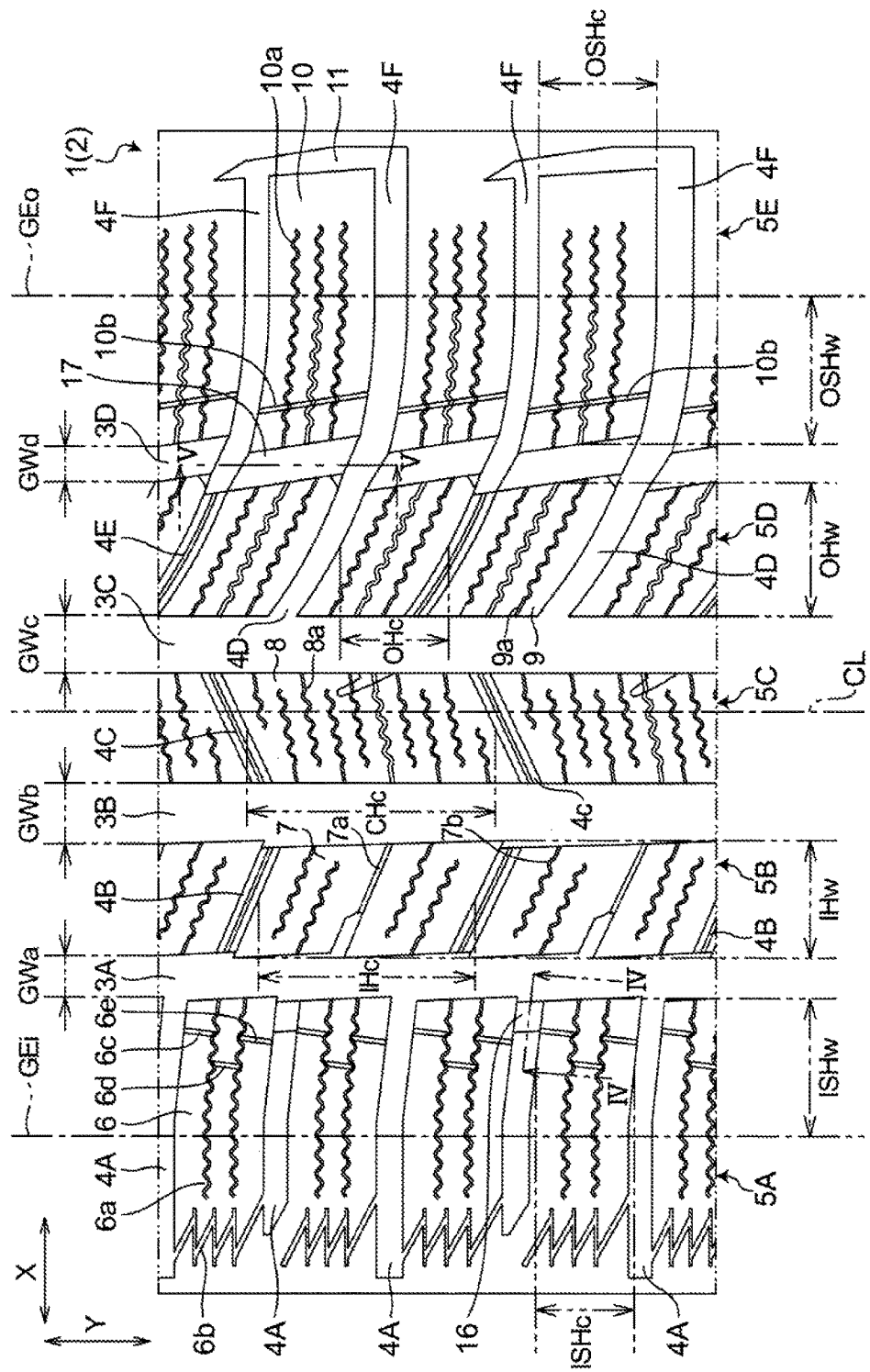
FIG. 2 is a partially enlarged view of FIG. 1.

Referring to FIG. 1 and FIG. 2, on a tread portion 2 of a pneumatic tire 1 which is a rubber-made snow tire according to this embodiment (hereinafter, referend to as "tire"), four main grooves 3A to 3D are formed such that the main grooves 3A to 3D extend in a tire circumferential direction (indicated by symbol Y in FIG. 1 and FIG. 2). A plurality of lateral grooves (lug grooves) 4A to 4F are formed on the tread portion 2 such that the lateral grooves 4A to 4F extend in a tire width direction (indicated by symbol X in FIG. 1 and FIG. 2).

A mounting posture of the tire 1 in a tire width direction with respect to a vehicle (not shown in the drawing) is designated. In the description made hereinafter, terms "inside" and "outside" in the tire width direction are determined with reference to the case where the tire 1 is mounted on the vehicle in a normal posture. In FIG. 1 and FIG. 2, a center line (equator line) in the tire width direction of the tread portion 2 is indicated by symbol CL. Ground contact edges of the tread portion 2 inside and outside the tread portion 2 in the tire width direction are indicated by symbol GEi and symbol GEo respectively.

Figure 3:
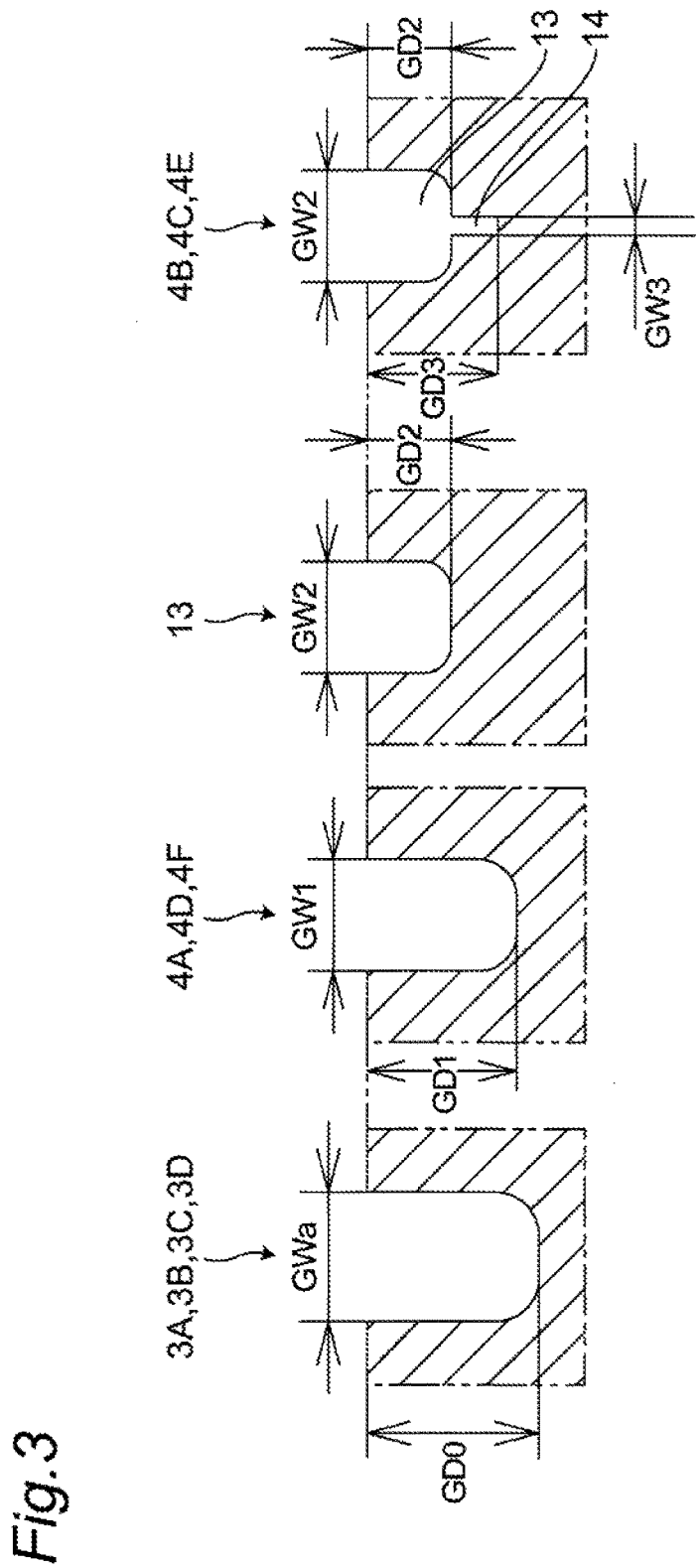
FIG. 3 is a schematic cross-sectional view for describing various grooves.

Also referring to FIG. 3, the inner main groove 3A positioned most inside in the tire width direction is a linear groove having a groove depth GD0 and having substantially a fixed groove width GWa. The outer main groove 3D positioned most outside in the tire width direction is a slightly meandering zigzag-shaped groove having a groove depth GD0 and having a groove width GWd. A first center main groove 3B disposed adjacently to an outer side of the inner main groove 3A in the tire width direction is a linear groove having a groove depth GD0 and having substantially a fixed groove width GWb. A second center main groove 3C disposed adjacently to an inner side of the outer main groove 3D in the tire width direction and adjacently to an outer side of the first center main groove 3B in the tire width direction is a linear groove having a groove depth GD0 and having substantially a fixed groove width GWc.

With four main grooves 3A to 3D and the lateral grooves 4A to 4F, five block rows extending in the tire circumferential direction are formed. That is, the inner shoulder row 5A, the inner intermediate row 5B, the center row 5C, the outer intermediate row 5D and the outer shoulder row 5E are formed.

Among the block rows, the inner shoulder row 5A positioned most inside in the tire width direction is positioned inside the inner main groove 3A in the tire width direction. The inner shoulder row 5A expands toward the inside in the tire width direction (a side portion side of the tire 1 not shown in the drawing) beyond the inner ground contact edge GEi. The inner shoulder row 5A includes a plurality of inner shoulder blocks 6 defined by the inner main groove 3A and the plurality of lateral grooves 4A (first lateral grooves) formed at intervals in the tire circumferential direction. In other words, the inner shoulder row 5A is formed of the plurality of inner shoulder blocks 6 arranged in a row in the tire circumferential direction. Two sipes 6a extending in the tire width direction are formed on each individual inner shoulder block 6. A zigzag-shaped slit 6b extending in the tire circumferential direction is formed on a most inner portion of each individual inner shoulder block 6 in the tire width direction. Further, three inner longitudinal slits (first slits) 6c, 6d, 6e are formed on each individual inner shoulder block 6 as described in detail later.

Among the block rows, the outer shoulder row 5E positioned most outside in the tire width direction is positioned outside the outer main groove 3D in the tire width direction. The outer shoulder row 5E expands toward the outside in the tire width direction (a side portion side of the tire 1 not shown in the drawing) beyond the outer ground contact edge GEo. The outer shoulder row 5E includes a plurality of outer shoulder blocks 10 defined by the outer main groove 3D and the plurality of lateral grooves 4F (second lateral grooves) formed at intervals in the tire circumferential direction. In other words, the outer shoulder row 5E is formed of the plurality of outer shoulder blocks 10 arranged in a row in the tire circumferential direction. Three sipes 10a extending in the tire width direction are formed on each individual outer shoulder block 10. An outer longitudinal slit (second slit) 10b is formed on each individual outer shoulder block 10 as described in detail later. A pair of lateral grooves 4F disposed adjacently to each other in the tire circumferential direction is connected to each other by short longitudinal grooves 11 in a region further outside the outer ground contact edge GEo.

The inner intermediate row 5B is disposed adjacently to an outer side of the inner shoulder row 5A in the tire width direction, and is positioned between the inner main groove 3A and the first center main groove 3B. The inner intermediate row 5B includes a plurality of inner intermediate blocks 7 defined by the inner main groove 3A, the first center main groove 3B, and a plurality of lateral grooves 4B formed at intervals in the tire circumferential direction. In other words, the inner intermediate row 5B is formed of the plurality of inner intermediate blocks 7 arranged in a row in the tire circumferential direction. A lateral slit 7a which penetrates the individual inner intermediate block 7 in the tire width direction is formed in the vicinity of the center of the inner intermediate block 7 in the tire circumferential direction. Further, on the inner intermediate block 7, two sipes 7b extending in the tire width direction are formed on both sides of the lateral slit 7a respectively.

The outer intermediate row 5D is disposed adjacently to an inner side of the outer shoulder row 5E in the tire width direction, and is positioned between the outer main groove 3D and the second center main groove 3C. The outer intermediate row 5D includes a plurality of outer intermediate blocks 9 defined, by the outer main groove 3D, the second center main groove 3C, and a plurality of lateral grooves (third lateral grooves) 4D, 4E formed alternately at intervals in the tire circumferential direction. In other words, the outer intermediate row 5D is formed of the plurality of outer intermediate blocks 9 arranged in a row in the tire circumferential direction. Three sipes 9a extending in the tire width direction are formed on each individual outer intermediate block 9.

The center row 5C is formed on the center line CL. The center row 5C is disposed adjacently to the inner intermediate row 5B and the outer intermediate row 5D, and is positioned between the first center main groove 3B and the second center main groove 3C. The center row 5C includes a plurality of center blocks 8 defined by the first center main groove 3B, the second center main groove 3C, and a plurality of lateral grooves 4C formed at intervals in the tire circumferential direction. In other words, the center row 5C is formed of the plurality of center blocks 8 arranged in a row in the tire circumferential direction. A plurality of sipes 8a extending in the tire width direction are formed on each individual center block 8.

The lateral grooves 4A to 4F are described with reference to FIG. 3. The lateral groove 4A formed on the inner shoulder row 5A, the lateral groove 4D formed on the outer intermediate row 5D and the lateral groove 4F formed on the outer shoulder row 5E are respectively formed of a "deep lateral groove". On the other hand, the lateral groove 4B formed on the inner intermediate row 5B, the lateral groove 4C formed on the center row 5C, and the lateral groove 4E formed on the outer intermediate row 5D are respectively formed of a "shallow groove with sipes".

The lateral groove 4A, 4D, 4F which is the "deep lateral groove" has substantially a rectangular cross-sectional shape. A groove depth GD1 of these lateral grooves 4A, 4D, 4F is set 0.85 to 1.0 times inclusive as large as the groove depth D0 of the main grooves 3A to 3D ($0.85GD0 \leq GD1 \leq 1.0GD0$). The groove width GW1 of these lateral grooves 4A, 4D, 4F is preferably set to a value which falls within a range of from 2.5 mm to 8 mm inclusive.

The lateral grooves 4B, 4C, 4E which are formed of the "shallow groove with sipes" are formed into a shape where sipes 14 are formed on a groove bottom of the shallow groove 13. In this specification, grooves having a groove depth GD2 which is 0.4 to 0.6 times inclusive as large as the groove depth GD0 of the main grooves 3A to 3D are referred to as "shallow grooves" ($0.4GD0 \leq GD2 \leq 0.6GD0$). A groove width GW2 of "shallow groove" is preferably equal to or less than the groove width GW1 of "deep lateral groove" ($GW2 \leq GW1$). Further, in this specification, "sipe" is referred to as a cut having a narrower width than "main groove", "deep lateral groove" and "shallow groove". In general, the width GW3 is set to a value which falls within a range of from 0.8 mm to 1.5 mm inclusive, and the depth is 2 mm or less. It is preferable that the groove depth GD3 of "shallow groove with sipes" be 0.6 to 1.0 times inclusive as large as the groove depth GD0 of the main grooves 3A to 3D ($0.6GD3 \leq GD0 \leq GD0$ $0.6GD0 \leq GD3 \leq 1.0GD0$). The concept of "sipe" also embraces the sipes 6a of the inner shoulder block 6, the sipes 10a of the outer shoulder block 10, the sipes 7b of the inner intermediate block 7, the sipes 9a of the outer intermediate block 9, and the sipes 8a of the center block 8.

In general, "shallow groove with sipes" exhibits strong resistance against falling of the block caused by a reaction from a ground surface compared to the grooves having the same full depth. Accordingly, it is possible to prevent also lowering of rigidity while preventing lowering a snow column shearing force. To acquire a snow performance enhancing effect by adding the sipes 14 to the groove bottom of the shallow groove 13, it is preferable that the depth of the sipes 14 per se be 0.2 mm or more at minimum. On the other hand, when the width GW3 of "sipes" is smaller than 0.8 mm, a snow performance enhancing effect is small, while when the width GW3 exceeds 1.5 mm, rigidity of the tread portion is largely lowered and hence, both cases are not desirable.

As describe previously, the zigzag-shaped slit 6b is formed on the inner shoulder block 6. The inner longitudinal slits 6c, 6d, 6e are formed on the inner shoulder block 6.

The outer longitudinal slit 10b is formed on the outer shoulder block 10. The lateral slit 7a is formed on the inner intermediate block 7. In this specification, these "slits" are referred to cuts having a smaller groove depth and a narrower groove width than "main grooves", "deep lateral grooves" and "shallow grooves" while having a larger groove depth and a wider groove width, than "sipes".

Referring to FIG. 2, in the inner intermediate block 7 which forms the inner intermediate row 5B, a tire circumferential direction length IHc is larger than a tire width direction length IHw. That is, the inner intermediate block 7 has an elongated shape in the tire circumferential direction. It is preferable that, for example, the tire circumferential direction length IHc be set 1.3 to 1.9 times inclusive as large as the tire width direction length IHw ($1.3 \leq IHc/IHw \leq 1.9$). A camber angle is imparted to the tire 1 mounted on a vehicle. There is a tendency that a shape of a ground contact region on a road surface extends in a tire circumferential direction on an inner portion of the tread portion 2 in a tire width direction (particularly, at the time of applying braking). Accordingly, by forming the inner intermediate block 7 into an elongated shape in the tire circumferential direction, drive performance and braking performance on a dry road surface can be enhanced. Further, by forming the inner intermediate block 7 into an elongated shape in the tire circumferential direction, responsiveness to a steering angle when a handle is steered during traveling is enhanced.

Referring to FIG. 2, in the outer intermediate block 9 which forms the outer intermediate row 5D, a tire width direction length OHw is larger than a tire circumferential direction length OHc. That is, the outer intermediate block 9 has an elongated shape in the tire width direction. It is preferable that, for example, the tire width direction length OHw be set 1.1 to 1.5 times inclusive as large as the tire circumferential direction length OHc ($1.1 \leq OHw/OHc \leq 1.5$). By forming the outer intermediate block 9 into an elongated shape in the tire width direction, rigidity of the outer intermediate block 9 against a load in a lateral direction (tire width direction) is increased and hence, turning performance on a dry road surface is enhanced. Further, the outer intermediate block 9 is formed into an elongated shape in the tire width direction and hence, an edge component in a tire width direction is increased in a region outside the tread portion 2 in the tire width direction. As a result, drive performance and braking performance on a snowy road surface are also enhanced.

In this embodiment, the total number Na of the inner shoulder blocks 6 is set larger than the total number Ne of the outer shoulder blocks 10 (Na>Ne). Further, the total number Nb of the inner intermediate blocks 7 is set smaller than the total number Nd of the outer intermediate blocks 9 (Nb<Nd). In this embodiment, the total number Nd of the outer intermediate blocks 9 and the total number Ne of the outer shoulder blocks 10 are set equal to each other (Nd=Ne). In short, in this embodiment, the total numbers of the blocks Na, Nb, Nd, Ne satisfy the following relationship.

$$Na > Nd = Ne > Nb$$

The total number Nc of the center blocks 8 is set smaller than the total numbers Na, Nb, Nd, Ne of the blocks in the block rows other than the center row C.

The total number Na of the inner shoulder blocks 6 can be set 1.8 to 2.5 times inclusive as large as the total number Nb of the inner intermediate blocks 7. The total number Nc of the center blocks 8 can be set 1.0 to 1.4 times inclusive as large as the total number Nb of the inner intermediate blocks 7. The total number Nd of the outer intermediate blocks 9 can be set 1.3 to 1.7 times inclusive as large as the total number Nb of the inner intermediate blocks 7. The total number Ne of the outer shoulder blocks 10 can be set 1.3 to 1.7 times inclusive as large as the total number Nb of the inner intermediate blocks 7.

By setting the total number Na of the inner shoulder blocks 6 larger than the total number Ne of the outer shoulder blocks 10, traction generated by a snow column shearing force is increased particularly at an inner side portion of the tread portion 2 in a tire width direction and hence, snow performance is enhanced. Further, setting the total number Na of the inner shoulder blocks 6 larger than the total number Ne of the outer shoulder blocks 10 means that the outer shoulder block 10 is relatively larger than the inner shoulder block 6 in size. Accordingly, rigidity of the outer shoulder block 10 against a load in a lateral direction becomes relatively high compared to rigidity of the inner shoulder block 6 against a load in a lateral direction and hence, turning performance on a dry road surface is enhanced.

By setting the total number Nb of the inner intermediate blocks 7 smaller than the total number Nd of the outer intermediate blocks 9, as described previously, the tire circumferential direction length IHc of the inner intermediate block 7 is set relatively large compared to the tire circumferential direction length OHc of the outer intermediate block. As a result, as described previously, drive performance and braking performance on a dry road surface are enhanced and, at the same time, responsiveness to a steering angle is also enhanced.

Referring to FIG. 2, the tire circumferential direction length CHc of the center block 8 is set larger than any of the tire circumferential direction lengths ISHc, IHc, OHc, OSHc of the inner shoulder block 6, the inner intermediate block 7, the outer intermediate block 9 and the outer shoulder block 10. The center row 5C includes a center portion in a tire width direction in the ground contact region with a road surface and hence, by setting the tire circumferential direction length IHc of the center block 8 large, responsiveness to a steering angle can be further enhanced.

With such technical features, the tire according to this embodiment can enhance drive performance and braking performance and, at the same time, can enhance turning performance.

Each of the inner intermediate blocks 7 which form the inner intermediate row 5B is defined by the lateral grooves 4 which are "shallow grooves with sipes". From this point of view, it may be also safe to say that the inner intermediate row 5B is not a block row but is substantially a rib row. As described previously, because of an effect of a camber angle, there is a tendency that a shape of a ground contact region with a road surface extends in a tire circumferential direction at an inner portion of the tread portion 2 in the tire width direction (particularly at the time of applying braking). Accordingly, by substantially forming the inner intermediate row 5B into a rib row, braking performance on a dry road surface is enhanced, and responsiveness to a steering angle is enhanced.

Each of the outer intermediate blocks 9 which form the outer intermediate row 5D is defined by alternately forming the lateral groove 4D which is "deep lateral groove" and the lateral groove 4E which is "shallow groove with sipes". As described previously, with respect to the outer intermediate block 9, the tire width direction length OHw is larger than the tire circumferential direction length OHc. In other words, the outer intermediate row 5D has a large size in the tire width direction. By forming the lateral groove 4D which is "deep lateral groove" on the outer intermediate row 5D having a large size in the tire width direction, traction on a snowy road surface can be increased and hence, drive performance and braking performance on the snowy road surface can be enhanced. A pair of outer intermediate blocks 9 disposed on both sides of the lateral groove 4E which is "shallow groove with sipes" in the tire circumferential direction can be regarded as one large block. Accordingly, rigidity of the outer intermediate row 5D in the longitudinal direction (tire circumferential direction) can be enhanced so that steering stability can be enhanced.

Hereinafter, various other technical features of the tire 1 according to this embodiment are described.

Referring to FIG. 1 and FIG. 2, the groove width GWb of the first center main groove 3B and the groove width GWc of the second center main groove 3C are set larger than the groove width GWa of the inner main groove 3A and the groove width GWd of the outer main groove 3D.

The first center main groove 3B and the second center main groove 3C are positioned at the center of the tread portion 2 in the tire width direction. At the center of the tread portion 2 in the tire width direction, a boundary portion of a ground contact region with a road surface extends in the tire width direction (lateral direction) in both a step-in side and a kick-out side. Therefore, water which intrudes into the ground contact region at the center of the tread portion 2 in the tire width direction has a velocity vector directed in the tire circumferential direction. Accordingly, by setting the groove widths GWb, GWc of the first center main groove 3B and the second center main groove 3C disposed at the center of the tread portion 2 in the tire width direction large, water which intrudes into the ground contact region can be efficiently introduced to the first center main groove 3B and the second center main groove 3C and hence, water can be effectively drained. That is, by setting the groove widths GWb, GWc of the first center main groove 3B and the second center main groove 3C large, drain performance can be enhanced.

Figure 4:
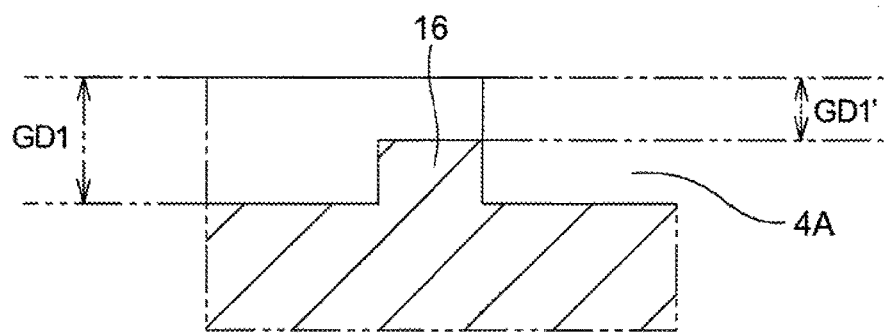
FIG. 4 is a schematic cross-sectional view taken along a line IV-IV in FIG. 2.

Referring to FIG. 1 and FIG. 2, a first raised portion 16 is formed on every one other of the plurality of lateral grooves 4A disposed on the inner shoulder row 5A. The first raised portion 16 is formed on an inner main groove 3A side of the lateral groove 4A such that a pair of inner shoulder blocks 6 positioned adjacently to both sides of the lateral groove 4A in the tire circumferential direction are connected to each other. A length of the first raised portion 16 in the tire width direction is set sufficiently smaller than a length of the lateral groove 4A in the tire width direction. Also referring to FIG. 4, a top surface of the first raised portion 16 is substantially flat. A groove depth GD1' of the lateral groove 4A in the first raised portion 16 is set shallower than a groove depth GD1 of the lateral groove 4A (being "deep lateral groove" as described previously) in portions other than the first raised portion 16.

Because of an effect of a camber angle, there is a tendency that a shape of a ground contact region with a road surface extends in a tire circumferential direction at an inner portion of the tread portion 2 in the tire width direction (particularly at the time of applying braking). Accordingly, by connecting the inner shoulder blocks 6 which form the inner shoulder row 5A to each other by the first raised portion 16, the rigidity of the inner shoulder blocks 6 in the longitudinal direction as well as in the lateral direction can be enhanced whereby drive performance and braking performance on a dry road surface can be enhanced.

The first raised portion 16 is formed on a plurality of lateral grooves 4A every one other. Accordingly, in the lateral grooves 4A on which the first raised portion 16 is not formed, the flow of water is not obstructed by the first raised portion 16 and hence, priority is assigned to the ensuring of drain performance. That is, by forming the first raised portion 16 on the plurality of lateral grooves 4A every one other, the tire 1 can acquire both the ensuring of drain performance and the enhancement of drive performance and braking performance on a dry road surface.

It is preferable that the groove depth GD1' of the lateral groove 4A in the first raised portion 16 be set 0.4 to 0.6 times inclusive as large as the groove depth GD1 of other portions of the lateral groove 4A. When the groove depth GD1' exceeds 0.6 times of the groove depth GD1, the height of the first raised portion 16 becomes short so that a rigidity enhancing effect in the longitudinal direction brought about by connecting the inner shoulder blocks 6 by the first raised portion 16 cannot be sufficiently acquired. On the other hand, when the groove depth GD1' becomes lower than 0.4 times of the groove depth GD1, the groove depth of the lateral groove 4A becomes short and hence, drain performance of the lateral groove 4A is remarkably impaired.

Figure 5:
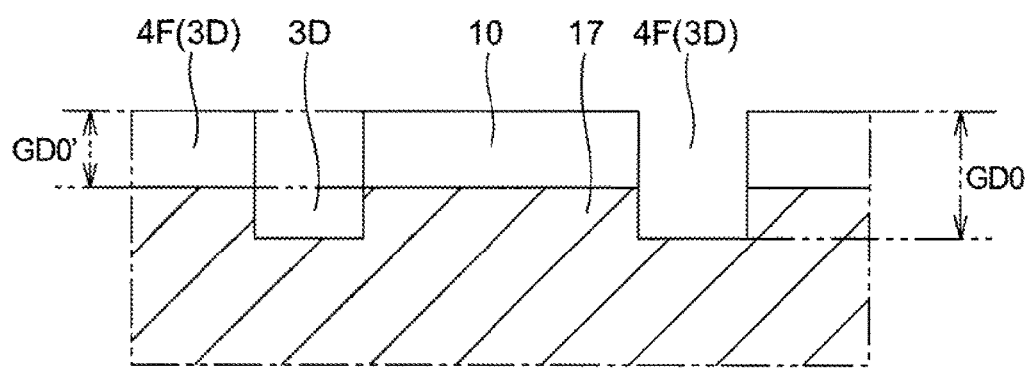
FIG. 5 is a schematic cross-sectional view taken along a line V-V in FIG. 2.

Referring to FIG. 1 and FIG. 2, a second raised portion 17 is formed on the outer main groove 3D in a region defined by an imaginary line which connects the outer intermediate block 9 which forms the outer intermediate row 5D and the outer shoulder block 10 which forms the outer shoulder row 5E to each other. An outer side surface of the outer intermediate block 9 in the tire width direction and an inner side surface of the outer intermediate block 10 in the tire width direction are connected to each other by the second raised portion 17. Also referring to FIG. 5, an edge surface of the second raised portion 17 is substantially flat. A groove depth GW0' of the outer main groove 3D in the second raised portion 17 is set shallower than a groove depth GW0 of the outer main groove 3D in portions other than the second, raised portion 17.

One side in the tire width direction of the outer intermediate block 9 which forms the outer intermediate row 5D is defined by the outer main groove 3D. Both sides of the outer intermediate block 9 in the tire circumferential direction are defined by the lateral grooves 4D, 4E. These outer main grooves 3D and lateral grooves 4D, 4E allow the deformation of the outer intermediate blocks 9 in the tire with direction and hence, the outer main grooves 3D and lateral grooves 4D, 4E lowers the rigidity in the lateral direction (tire width direction). However, by connecting the outer intermediate block 9 and the outer shoulder block 10 to each other by the second raised portion 17, it is possible to make these blocks 9, 10 deformed integrally against a load in the lateral direction. That is, with the formation of the second raised portion 17, the rigidity of the outer intermediate block 9 in the lateral direction can be enhanced and hence, steering performance or turning performance on a dray road surface can be enhanced.

The second raised portion 17 is not formed on the entire outer main groove 3D but is partially formed in the region defined by the imaginary line which connects the outer intermediate block 9 and the outer shoulder block 10 to each other. Accordingly, an effect which the second raised portion 17 exerts on the flow of water in the outer main groove 3D is limited and hence, drain performance is ensured.

It is preferable that the groove depth GD0' of the outer main groove 3D in the second raised portion 17 be set 0.5 to 0.7 times inclusive as large as the groove depth GD0 of other portions of the outer main groove 3D. When the groove depth GD0' exceeds 0.7 times of the groove depth GD0, the height of the second raised portion 17 becomes short so that a rigidity enhancing effect in the lateral direction brought about by connecting the outer intermediate block 9 to the outer shoulder block 10 by the second raised portion 17 cannot be sufficiently acquired. On the other hand, when the groove depth GD0' becomes lower than 0.5 times of the groove depth GD0, the groove depth of the outer main groove 3D becomes short and hence, drain performance of the outer main groove 3D is remarkably impaired.

Referring to FIG. 1 and FIG. 2, as described previously, three inner longitudinal slits 6c to 6e are formed in the inner shoulder block 6 which forms the inner shoulder row 5A. These inner longitudinal slits 6c to 6e are arranged in the tire circumferential direction such that the slits 6c to 6e do not overlap with each other. One ends of the inner longitudinal slits 6c, 6e terminate in the inner shoulder block 6, and the other ends of the inner longitudinal slits 6c, 6e penetrate a side surface of the inner shoulder block 6 in the tire circumferential direction. Both ends of the inner longitudinal slit 6d terminate in the shoulder block 6. The inner longitudinal slits 6c, 6e are set substantially at the same position in the tire width direction. The inner longitudinal slit 6d arranged between the inner longitudinal slits 6c, 6e in the tire circumferential direction is disposed at the position offset toward the inside with respect to the inner longitudinal slits 6c, 6e in the tire width direction. In other words, three inner longitudinal slits 6c to 6e are arranged in a staggered manner in the circumferential direction.

Because of an effect of a camber angle, there is a tendency that a shape of a ground contact region with a road surface extends in a tire circumferential direction at an inner portion of the tread portion in the tire width direction, that is, at a portion where the inner shoulder row 5A is formed (particularly at the time of applying braking). By forming the inner longitudinal slits 6c to 6e arranged in a staggered manner on the inner shoulder block 6, it is possible to disperse the deformation and a ground contact pressure in the inner shoulder block 6 at the time of applying braking. As a result, braking performance on a dray road surface can be enhanced.

Referring to FIG. 1 and FIG. 2, as described previously, three inner longitudinal slits 6c to 6e are formed in the inner shoulder block 6 which forms the inner shoulder row 5A. These inner longitudinal slits 6c to 6e are arranged in the tire circumferential direction such that the slits 6c to 6e do not overlap with each other. One ends of the inner longitudinal slits 6c, 6e terminate in the inner shoulder block 6, and the other ends of the inner longitudinal slits 6c, 6e penetrate a side surface of the inner shoulder block 6 in the tire circumferential direction. Both ends of the inner longitudinal slit 6d terminate in the shoulder block 6. The inner longitudinal slits 6c, 6e are set substantially at the same position in the tire width direction. The inner longitudinal slit 6d arranged between the inner longitudinal slits 6c, 6e in the tire circumferential direction is disposed at the position offset toward the inside with respect to the inner longitudinal slits 6c, 6e in the tire width direction. In other words, three inner longitudinal slits 6c to 6e are arranged in a staggered manner in the circumferential direction.

The outer intermediate block 9 and the outer shoulder block 10 are connected to each other by the second raised portion 17. Accordingly, when the outer intermediate block 9 is deformed against a load in the lateral direction when a vehicle turns, the load in the lateral direction (the deformation in the tire width direction) is transmitted to the outer shoulder block 10 from the outer intermediate block 9. By forming the outer longitudinal slits 10b in the outer shoulder block 10, the load in the lateral direction (the deformation in the tire width direction) transmitted to the outer shoulder block 10 from the outer intermediate block 9 when a vehicle turns can be alleviated. As a result, turning performance on a dry road surface can be enhanced.

With the above-mentioned technical features, the tire 1 according to this embodiment can enhance drive performance, braking performance and turning performance while ensuring drain performance.

As described previously, in the outer intermediate row 5D, the lateral groove 4D which forms "deep lateral groove" and the lateral groove 4E which forms "shallow groove with sipes" are alternately formed. Compared to the pair of outer intermediate blocks 9 positioned on both sides of the lateral groove 4D which forms "deep lateral groove", the pair of outer intermediate blocks 9 positioned on both sides of the lateral groove 4E which forms "shallow groove with sipes" in the tire circumferential direction are relatively strongly connected to each other. In other words, there is a tendency that the pair of outer intermediate blocks 9 positioned on both sides of the lateral groove 4E in the tire circumferential direction is integrally deformed against a load in a longitudinal direction and a load in a lateral direction. Further, as described previously, by connecting the outer intermediate block 9 and the outer shoulder block 10 to each other using the second raised portion 17, these blocks 9 and 10 are integrally deformed against a load in a lateral direction. Due to such a structure, as indicated by symbol U in FIG. 1, it can be supposed that the pair of outer intermediate blocks 9 positioned on both sides of the lateral groove 4E which forms "shallow groove with sipes" in the tire circumferential direction and the pair of outer shoulder blocks 10 connected with these pair of outer intermediate blocks 9 using the second raised portion 17 form one unit. There is a tendency that this unit U is integrally deformed against a load in a longitudinal direction and a load in a lateral direction due to the lateral groove 4E which is "shallow groove with sipes" and the second raised portion 17. Since the unit U is provided on an outer portion of the tread portion 2 in the tire width direction, particularly, turning performance on a dry road surface is enhanced.

Evaluation Test 1

With respect to tires of comparative examples 1, 2, and tires of examples 1 to 4 shown in the following Table 1, evaluation tests were carried out on drive performance (dry drive performance), braking performance (dry braking performance), and turning performance (dry turning performance) on a dry road surface. Data which are not specifically referred to below are data shared in common among the tires of the comparative examples 1, 2 and the tire of the example 1. Particularly, with respect to all of the tires of the comparative examples 1, 2 and the tire of the example 1, the evaluation was made under conditions where a size of the tire is 225/50R17 and the tire is mounted on an FF sedan of 2000 cc.

TABLE 1

| Remarks | Comparative Example 1 | Comparative Example 2 | Example 1 |
| --- | --- | --- | --- |
| Characteristic 1 | GWb, GWc = GWa, GWd | GWb, GWc = GWa, GWd | GWb, GWc > GWa, GWd |
| Characteristic 2 | Present | Not present | Present |
| Characteristic 3 | Not present | Present | Present |
| Characteristic 4 | Not present | Not present | Present |
| Drive performance | 100 | 100 | 103 |
| Braking performance | 100 | 100 | 102 |
| Turning performance | 100 | 103 | 104 |

In Table 1, "characteristic 1" is a size relationship among groove widths GWb, GWc of first and second center main grooves 3B, 3C and groove widths GWa, GWd of inner and outer main grooves 3A, 3D. As described previously, in the first embodiment, the groove widths GWb, GWc are larger than the groove widths GWa, GWd. Next, "characteristic 2" is a structure where lateral grooves 4F formed on an outer shoulder row 5E extend outside in the tire width direction beyond an outer ground contact edge GEo disposed on the outer side in the tire width direction. "Characteristic 3" is a second raised portion 17 formed in a region defined by an imaginary line which connects outer intermediate blocks 9 which form an outer intermediate row 5D and outer shoulder blocks 10 which form an outer shoulder row 5E. "Characteristic 4" is the configuration where the lateral grooves 4D, 4E on the outer intermediate row 5 are positionally aligned with the lateral grooves 4F such that the lateral grooves 4D, 4E communicate with the lateral grooves 4F over a range from the second center main groove 3C to the ground contact edge GEo.

With respect to drive performance, each tire was mounted on a vehicle, and a time necessary for acceleration from a stopped state to 60 km/h on a dry road surface was measured. The evaluation was made by expressing a result of the tire of the comparative example 1 as an index of 100. In Table 1, the larger the index, the more excellent drive performance the tire has.

With respect to braking performance, each tire was mounted on a vehicle, and a braking distance required for stopping the vehicle after starting ABS braking at a speed of 100 km/h on a dry road surface was measured. The evaluation was made by expressing a result of the tire of the comparative example 1 as an index of 100. In Table 1, the larger the index, the more excellent braking performance the tire has.

With respect to turning performance, each tire was mounted on a vehicle, and the vehicle traveled while turning in a regular circle having a radius R20 on a dry road surface under a load condition where one person was in the vehicle. The lap time was evaluated by an index. The evaluation was made by expressing a result of the tire of the comparative example 1 as an index of 100. In Table 1, the larger the index, the more excellent dry braking performance the tire has.

With respect to the tire of the example 1, all of an index of drive performance, an index of braking performance, and an index of turning performance were 102 or more so that the tire of the example 1 had favorable drive performance, favorable braking performance, and favorable turning performance. On the other hand, with respect to tires of the comparative examples 1, 2, all of an index of drive performance, an index of braking performance, and an index of turning performance were smaller than corresponding indexes of the tire of the example 1. Particularly, with respect to the tire of the comparative example 2 which has "characteristic 3" but does not have "characteristic 2", that is the tire of the comparative example 2 where a second raised portion 17 is formed but lateral grooves 4F on an outer shoulder row 5E do not reach a ground contact edge GEo, an index of hydroplaning performance was 98. That is, hydroplaning performance of the tire of the comparative example 2 was largely inferior to that of the tire of the example 1.

As described above, from the result of comparison between the tires of the comparative examples 1, 2 and the tire of the example 1, it can be understood that the pneumatic tire according to this embodiment can enhance drive performance, braking performance and turning performance while ensuring drain performance.

Hereinafter, second to seventh embodiments are described. In the drawings relating to these embodiments, constitutional elements substantially equal or similar to corresponding constitutional elements of the first embodiment are given same or similar symbols. The structures which are not particularly limited in these embodiments are substantially equal or similar to the corresponding structures of the first aspect of the present invention. The second to fourth embodiments correspond to the second aspect of the present invention, and the fifth to seventh embodiments correspond to the third aspect of the present invention.

Second Embodiment

Figure 6:
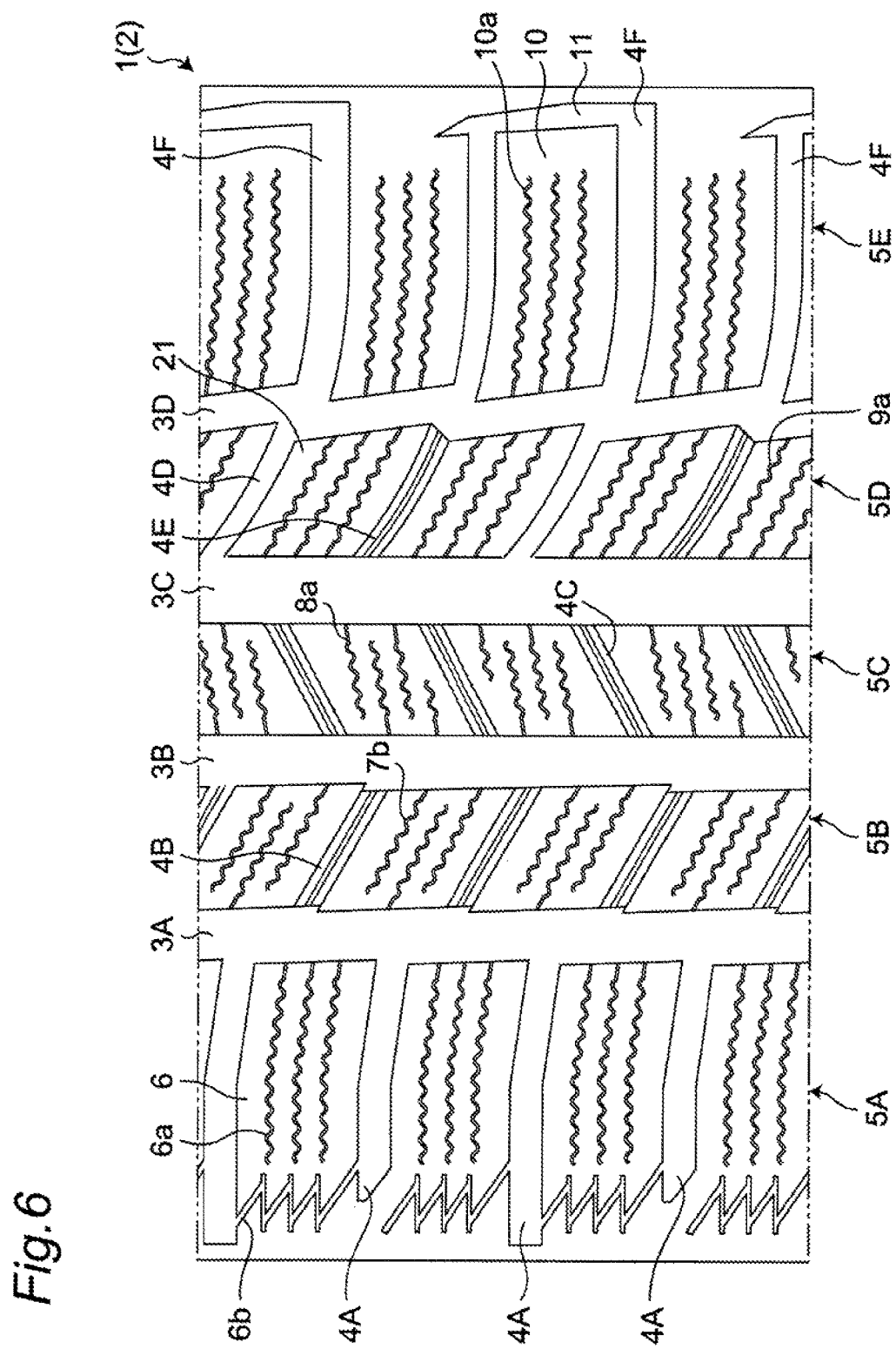
FIG. 6 is a developed view of a tread pattern of a tire according to a second embodiment of the present invention.

Referring to FIG. 6, on a tread portion 2 of a tire 1 according to a second embodiment, none of inner longitudinal slits 6c, 6d, 6e on an inner shoulder block 6, first raised portions 16, and second raised portions 17 (see also FIG. 1 and FIG. 2 with respect to these constitutional elements) are formed. The same goes for third to seventh embodiments described later with respect to this point.

Figure 7:
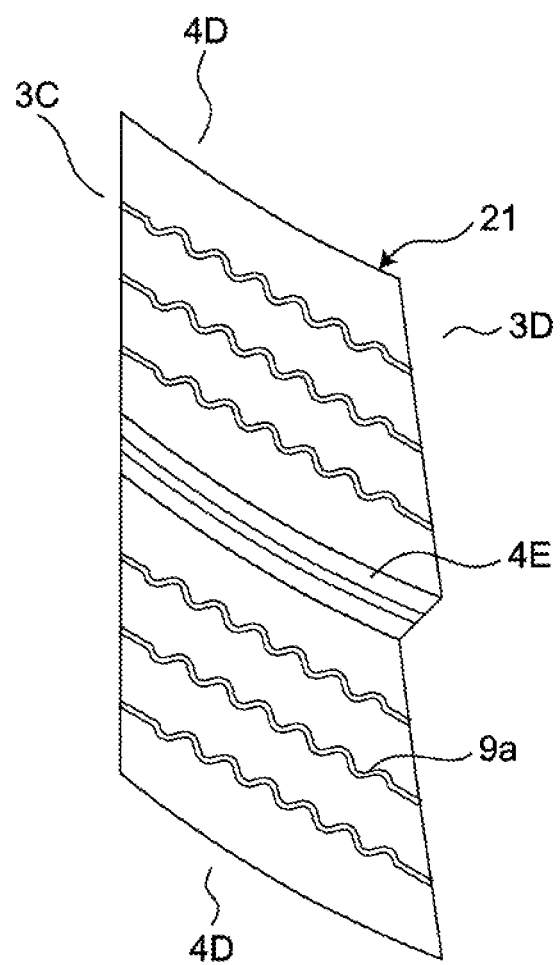
FIG. 7 is a partially enlarged view of FIG. 6.

On an outer intermediate row 5D disposed between a second center main groove 3C and an outer main groove 3D, a lateral groove 4D which is "deep groove" and a lateral groove 4E which is "shallow groove with sipes" are alternately formed. In the first embodiment, each outer intermediate block 9 which forms the outer intermediate row 5D is defined as a block defined by the second center main groove 3C, the outer main groove 3D, the lateral groove (deep groove) 4D, and the lateral groove (shallow groove with sipes) 4E. However, the lateral groove 4E which is "shallow groove with sipes" has a smaller groove volume than the lateral groove 4D which is "deep groove". By taking into account that the lateral groove 4E has the smaller groove volume than the lateral groove 4D, it can be considered that the outer intermediate row 5D is formed of only composite blocks 21 (see also FIG. 7). That is, "composite block" can be defined as a block which satisfies the following two conditions. This definition is also applicable to the third to seventh embodiments described later.

Firstly, "composite block" is defined by two "main grooves" disposed adjacently to each other in the tire width direction and two "deep grooves" disposed adjacently to each other in the tire circumferential direction.

Next, one or a plurality of "shallow grooves with sipes" are formed on a surface of "composite block". The "composite block" is divided into a plurality of sub regions by "shallow grooves with sipes".

Advantageous effects obtained by forming the composite blocks 21 are described hereinafter.

Firstly, "block" means an island-shaped portion which is separated from the surrounding by the main grooves and the lateral grooves. Assuming that only a plurality of simple blocks are formed on the tread portion 2, each block has high independence and hence, the rigidity of the tread portion is lowered. As a result, dry performance (that is, motion performance such as acceleration, braking and turning on a dry road surface) is also lowered.

Secondly, to alleviate lowering of dry performance, some "lateral grooves" are replaced with "shallow grooves" so that the rigidity of the tread surface can be increased. However, a snow column shearing force when a vehicle travels on a snowy road is lowered by an amount of groove volume difference caused by the replacement of "lateral grooves" with "shallow grooves" so that snow performance (that is, motion performance such as acceleration, braking and turning on a snowy road) is lowered.

Thirdly, in the present invention, "shallow groove" is formed on "block", and "sipe" is formed on a groove bottom of "shallow groove". That is, "shallow groove with sipes" is formed on "block" (composite block). By forming "sipe" is on the groove bottom of "shallow groove", compared to a case where the sipe is not formed on the bottom of the shallow groove, the shallow groove can be largely opened and hence, a snow column shearing force can be increased. That is, snow performance can be enhanced.

The above technical feature can be recapitulated as follows. That is, when only the simple blocks defined by the main grooves and the lateral grooves which are "deep grooves" are formed on the tread portion, the tire has low dry performance. Accordingly, by replacing some "deep groove" with "shallow grooves", dry performance is increased. On the other hand, snow performance is lowered by an amount of groove volume difference caused by the replacement of "lateral grooves" with "shallow grooves". To alleviate this lowering of snow performance, "sipe" is additionally formed on a bottom of each "shallow groove". With such a configuration, the tire can exhibit both excellent snow performance and excellent dry performance.

As described above, in this embodiment, the outer intermediate row 5D is formed of only composite blocks 21.

In this embodiment, each block 6 on the inner shoulder row 5A is simply divided by lateral grooves 4A which are "deep grooves", and corrugated sipes 6a are formed on a surface of each block 6. In the same manner, each block 10 on the outer shoulder row 5E is simply divided by lateral grooves 4F which are "deep grooves", and corrugated sipes 10a are formed on a surface of each block 10.

Further, in this embodiment, "deep groove" is not formed on the inner intermediate row 5B. The lateral grooves 4B which are "shallow grooves with sipes" are formed on the inner intermediate row 5B, and corrugated sipes 7b are formed on a surface of the inner intermediate row 5B. In the same manner, "deep groove" is not formed on the center row 5C. The lateral grooves 4C which are "shallow grooves with sipes" are formed on the center row 5C, and corrugated sipes 8a are formed on a surface of the center row 5C.

In the first embodiment, each block 7 (see FIG. 1 and FIG. 2) on the inner intermediate row 5B is defined as a block defined by the inner main groove 3A, the first center main groove 3B, and two lateral grooves 4B which are "shallow grooves with sipes". In the first embodiment, each block 8 (see FIG. 1 and FIG. 2) on the center row 5C is defined as a block defined by the first center main groove 3B, the second center main groove 3C, and two lateral grooves 4C which are "shallow grooves with sipes".

However, by taking into account that the lateral groove 4B, 4C which is "shallow groove with sipes" has a smaller groove volume than "deep groove", it can be considered that a rib which is not divided into blocks is continuously formed in the inner intermediate row 5B and the center row 5C respectively. That is, the structure which satisfies the following three conditions can be defined as "rib". This definition is also applicable to the third to seventh embodiments described later.

Firstly, "rib" is defined by two "main grooves" disposed adjacently to each other in the tire width direction.

Secondly, "rib" is continuously formed in the tire circumferential direction, or "shallow grooves" or "shallow grooves with sipes" are formed on "rib".

Thirdly, "deep groove" is not formed on "rib".

In this embodiment, the lateral grooves 4B, 4C which are "shallow grooves with sipes" are respectively formed on the ribs (the inner intermediate row 5B and the center row 5C) at intervals in the tire circumferential direction. Corrugated sipes 7a are formed on the rib between each two adjacent lateral grooves 4B, and corrugated sipes 8a are formed on the rib between each two adjacent lateral grooves 4C.

It is preferable that the row formed of only "composite blocks" be the outer intermediate row 5D. The reason is as follows.

That is, in general, due to a camber angle of the tire 1 mounted on a vehicle, there is a tendency that a ground contact length becomes larger on an inner side portion of the tread portion 2 in the tire width direction than on an outer side portion of the tread portion 2 in the tire width direction. On the inner side portion in the tire width direction where the ground contact length becomes larger than that on the outer side portion, it is desirable that a highest priority be assigned to the acquisition of high rigidity. By forming "rib" defined as described above, the tire can ensure high rigidity. As a result, "composite blocks" which slightly lowers the rigidity thereof but can enhance snow performance by an amount corresponding to lowering of the rigidity are formed on the outer side portion of the tread portion 2 in the tire width direction (outer intermediate row 5D).

It is preferable that "composite blocks" be formed neither on the inner shoulder portion in the tire width direction nor on the outer shoulder portion in the tire width direction.

That is, to prevent hydroplaning on a wet road surface, it is necessary to efficiently drain water from the tread surface to sides (outer sides) of a tire. Accordingly, it is desirable to enhance drainage efficiency by forming a large number of "deep grooves" rather than arranging "composite blocks" on the inner shoulder portion in the tire width direction and on the outer shoulder portion in the tire width direction.

Third Embodiment

Figure 8:
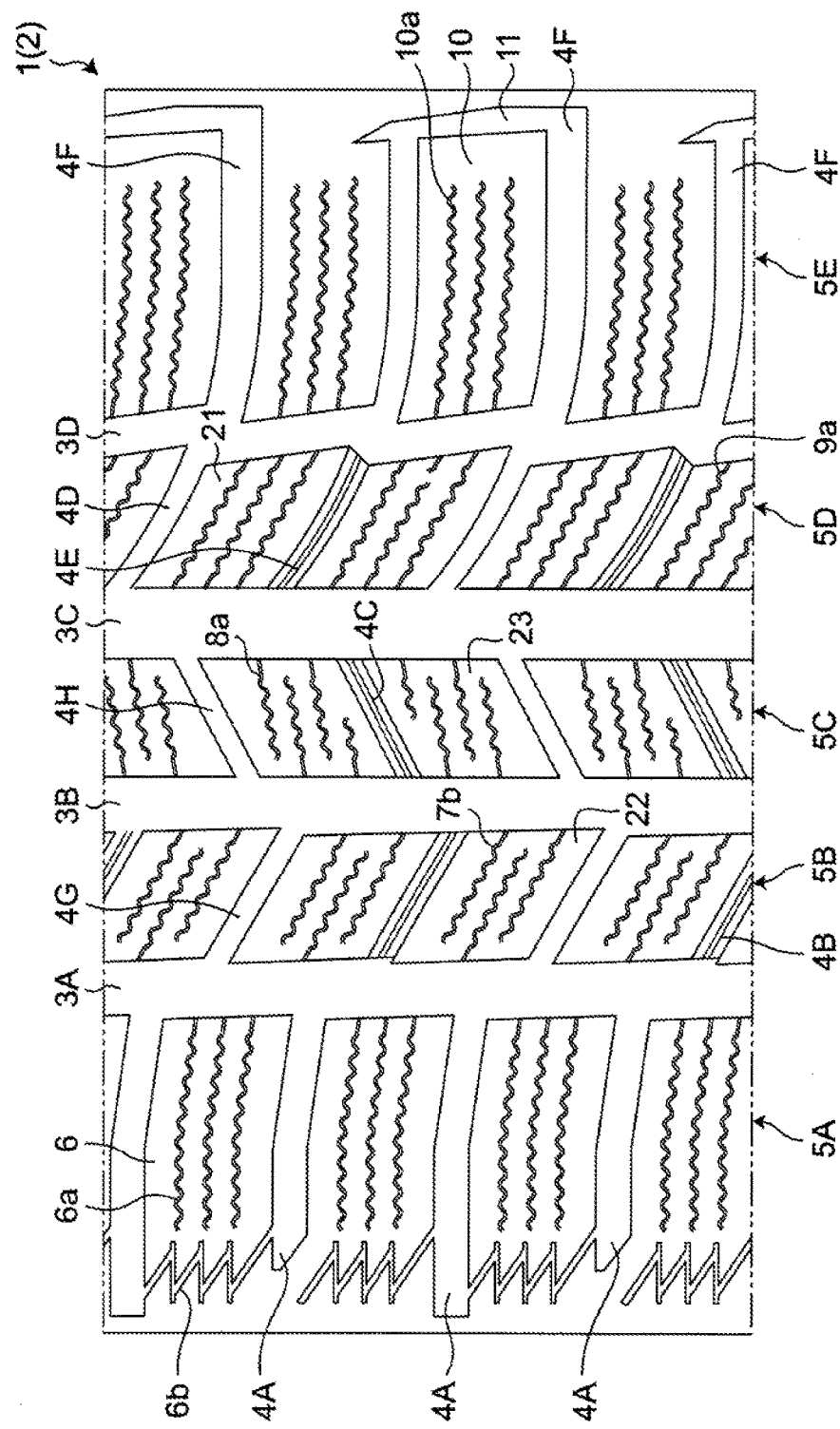
FIG. 8 is a developed view of a tread pattern of a tire according to a third embodiment of the present invention.

Referring to FIG. 8, a tread portion 2 of a tire 1 according to a third embodiment differs from the tread portion 2 of the tire 1 according to the second embodiment only with respect to the configuration of the inner intermediate row 5B and the center row 5C.

Figure 9A:
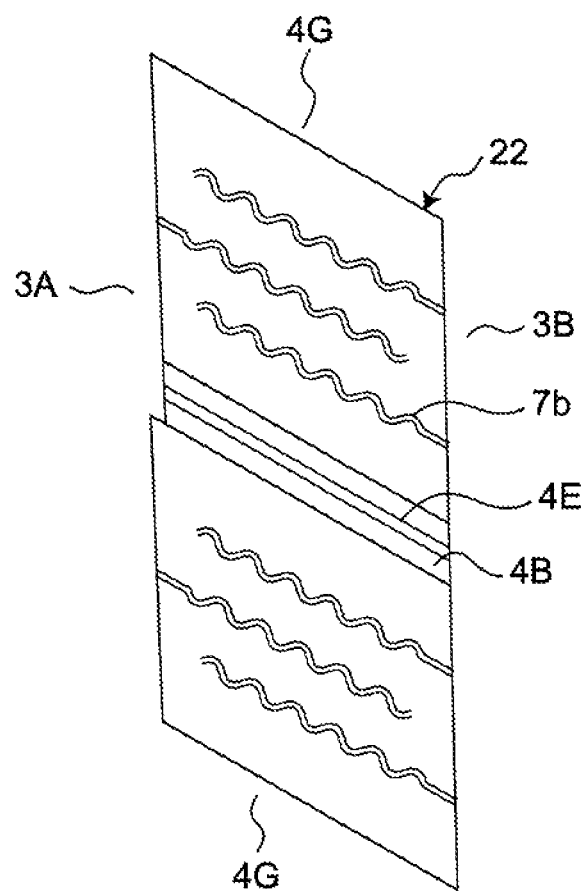
FIG. 9A is a partially enlarged view of FIG. 8.

On the inner intermediate row 5B, a lateral groove 40 which is "deep groove" and a lateral groove 4B which is "shallow groove with sipes" are alternately formed. Accordingly, the inner intermediate row 5B is formed of a plurality of composite blocks 22 each of which is divided by the lateral grooves 4G which are "deep grooves" (see also FIG. 9A).

Figure 9B:
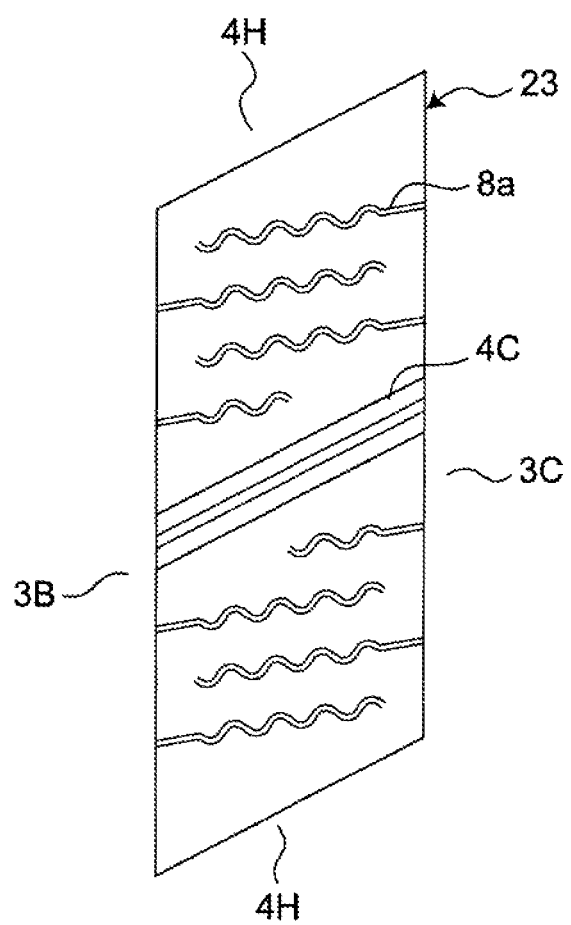
FIG. 9B is a partially enlarged view of FIG. 8.

In the same manner, on the center row 5C, a lateral groove 4H which is "deep groove" and a lateral groove 4C which is "shallow groove with sipes" are alternately formed. Accordingly, the center row 5C is formed of a plurality of composite blocks 23 each of which is divided by the lateral grooves 4H which are "deep grooves" (see also FIG. 9B).

Fourth Embodiment

Figure 10:
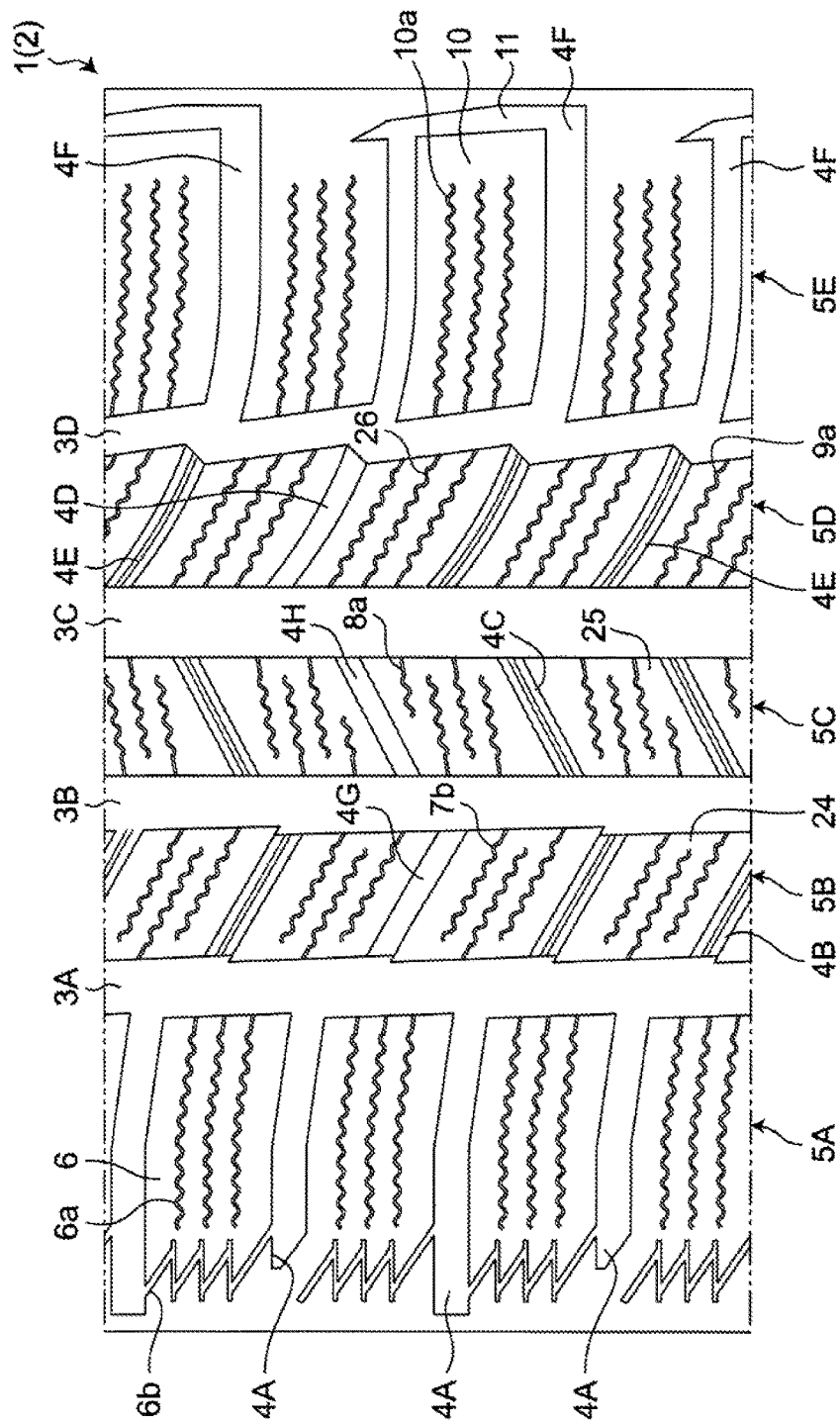
FIG. 10 is a developed view of a tread pattern of a tire according to a fourth embodiment of the present invention.

Referring to FIG. 10, on a tread portion 2 of a tire 1 according to a fourth embodiment, an inner intermediate row 5B, a center row 5C, and an outer intermediate row 5D are formed of only "composite blocks" respectively.

Figure 11A:
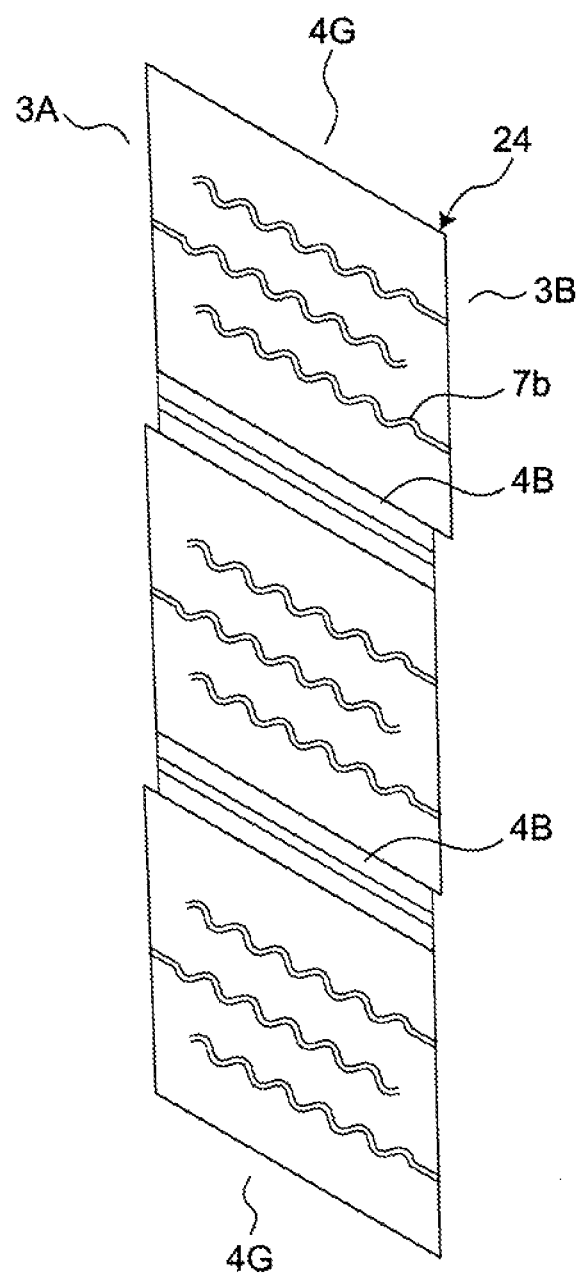
FIG. 11A is a partially enlarged view of FIG. 10.

On the inner intermediate row 5B, two lateral grooves 4B which are "shallow grooves with sipes" are formed between two lateral grooves 4G which are "deep grooves". One composite block 24 is defined by an inner main groove 3A, a first center main groove 3B, and two lateral grooves 4G which are "deep grooves" (see also FIG. 11A).

Figure 11B:
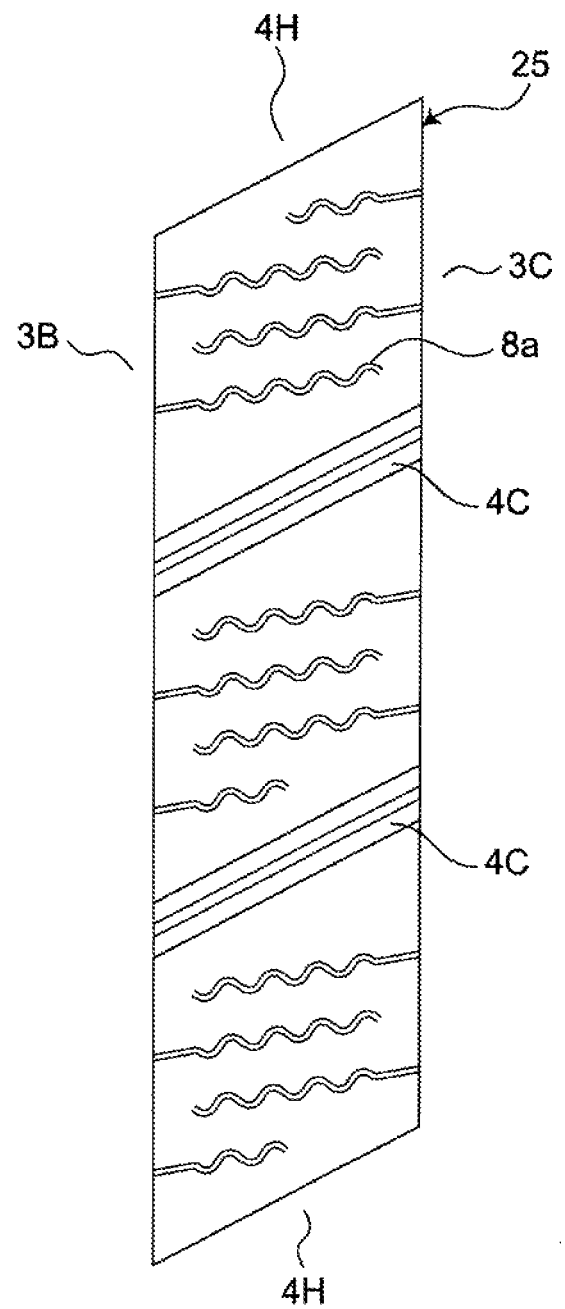
FIG. 11B is a partially enlarged view of FIG. 10.

In the same manner, on the center row 5C, two lateral grooves 4C which are "shallow groove with sipes" are formed between two lateral grooves 4H which are "deep grooves". One composite block 25 is defined by a first center main groove 3B, a second center main groove 3C, and two lateral grooves 4H which are "deep grooves" (see also FIG. 11B).

Figure 11C:
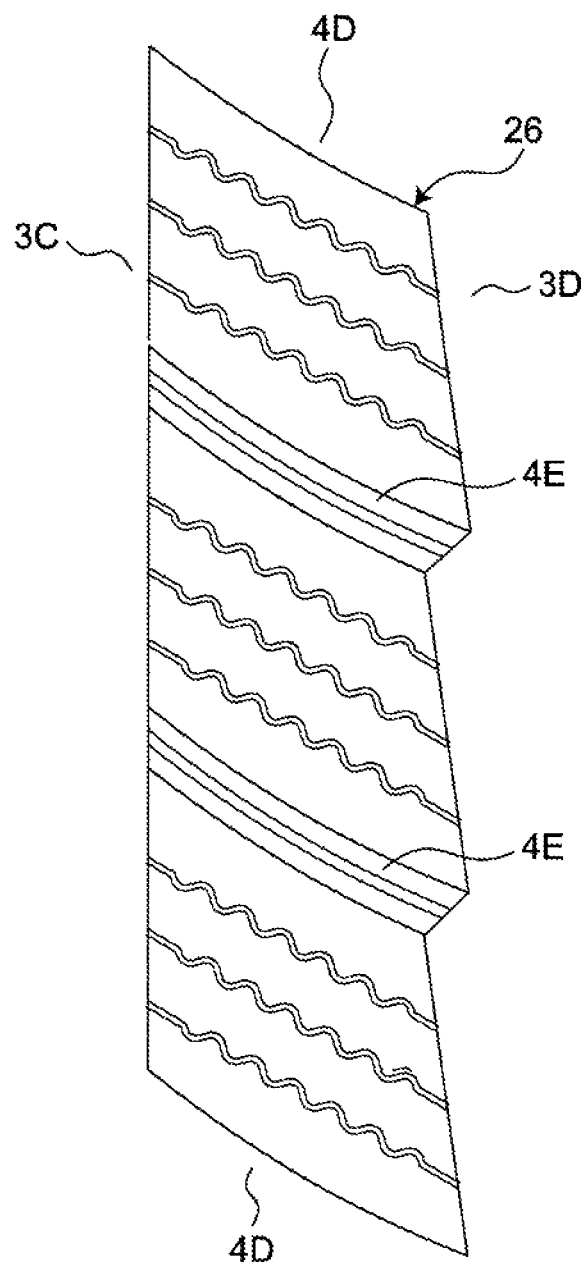
FIG. 11C is a partially enlarged view of FIG. 10.

On the outer intermediate row 5D, two lateral grooves 4E which are "shallow grooves with sipes" are formed between two lateral grooves 4D which are "deep grooves". One composite block 26 is defined by a second center main groove 3C, an outer main groove 3C, and two lateral grooves 4D which are "deep grooves" (see also FIG. 11C).

Unlike the second and third embodiments, in the fourth embodiment, each composite block 24, 25, 26 has two "shallow grooves with sipes" and hence, a surface of the block is divided into three sub regions.

Other Aspects of Second to Fourth Embodiments

In the second to fourth embodiments, the tires have four main grooves respectively. In the second aspect of the present invention, however, it is sufficient that the tire has at least three main grooves. When the tire has three main grooves, two rows of blocks or ribs are disposed between an inner shoulder row and an outer shoulder row. At least one row out of two rows, all blocks belonging to the one row are formed of "composite blocks". The same goes for the case where a tire has five or more main grooves.

In general, vehicle tires are classified into vehicle tires where a tire rotational direction when a vehicle advances is designated and vehicle tires such a tire rotational direction is not designated. The present invention is basically applicable to both types of tires. However, for example, in the second embodiment, it is significant that all blocks belonging to the outer intermediate row 5D are formed of "composite blocks 21". In such a case, it is a prerequisite that the tire rotational direction is designated.

Evaluation Test 2

With respect to the tires of the comparative examples 3 to 6 (see FIG. 13) and the tires of the examples 5 to 7, evaluation tests (snow performance test and dry performance test) were carried out. The tires of the examples 5 to 7 are respectively the tires of the second to fourth embodiments. The tires of the comparative examples 3 to 6 are equal to the tires of the examples 5 to 7 with respect to a point that the tires have four main grooves respectively. However, the tires of the comparative examples 3 to 6 differ from the tires of the examples 5 to 7 with respect to the following points.

In the tire of the comparative example 3, with respect to all four main grooves, ribs each of which is disposed between two adjacent main grooves are continuously formed in the tire circumferential direction without being divided by "lateral grooves". However, a plurality of "shallow grooves with sipes" are formed on each rib at intervals, and corrugated sipes are formed on the rib between each two adjacent "shallow grooves with sipes". The tire of the comparative example 3 does not have any "composite block". Further, as described previously, "shallow grooves with sipes" minimally impair the integrity between portions of the rib on both sides of "shallow grooves with sipes".

In the tire of the comparative example 4, with respect to all four main grooves, rib ridges each of which is disposed between two adjacent main grooves are divided by "lateral grooves". Corrugated sipes are formed on each block. The tire of the comparative example 4 does not have any "composite block", and all blocks are formed of simple blocks and hence, each block has high independence.

In the tire of the comparative example 5, with respect to all four main grooves, rib ridges each of which is disposed between two adjacent main grooves are not divided by "lateral grooves". However, "shallow grooves" are formed on the rib at intervals, and corrugated sipes are formed on the rib between each two adjacent "shallow grooves". The tire of the comparative example 5 does not have any "composite block". Further, as described previously, "shallow grooves" minimally impair the integrity between portions of the rib on both sides of "shallow grooves".

In the tire of the comparative example 6, with respect to all four main grooves, "composite blocks" are disposed between each two adjacent main grooves. In each row, a simple "block" separated from the periphery by main grooves and lateral grooves and "composite block" are repeatedly formed. In other words, in the tire of the comparative example 6, when attention is paid to a certain row, simple blocks each of which is sandwiched only by "lateral grooves" are included in the certain row other than "composite blocks".

The tires of examples 2 to 4 of the present invention and the tires of the comparative examples 3 to 6 which fall outside the scope of the present invention were mounted on vehicles, and comparison tests described hereinafter were carried out. Tire sizes of the respective tires and the vehicles used in the tests were as follows.

Tire size: 225/50 R 17
Vehicle used: Audi A4 (2000 cc, FF sedan)

In the snow performance test, each tire was mounted on a vehicle, and the vehicle traveled on a snowy road surface while performing acceleration, braking, turning, and a lane change. Then, steering stability performance was evaluated by a sensory test performed by a driver. The evaluation was made by expressing a result of the tire of the comparative example 3 as an index of 100. In Table 2, the larger the index, the more excellent snow steering stability performance the tire has.

In the dry performance test, each tire was mounted on a vehicle, and the vehicle traveled on a dry road surface while performing acceleration, braking, turning, and a lane change. Then, steering stability performance was evaluated by a sensory test made by a driver. The evaluation was made by expressing a result of the tire of the comparative example 3 as an index of 100. In Table 2, the larger the index, the more excellent dry steering stability performance the tire has.

TABLE 2

|  | Example 2 | Example 3 | Example 4 |
|---|---|---|---|
| Snow performance | 103 | 101 | 101 |
| Dry performance | 102 | 102 | 103 |

|  | Comparative Example 3 | Comparative Example 4 | Comparative Example 5 | Comparative Example 6 |
|---|---|---|---|---|
| Snow performance | 100 | 102 | 96 | 101 |
| Dry performance | 100 | 96 | 102 | 98 |

With respect to the tires of the examples 2 to 4, both snow performance and dry performance were higher than those of the tire of the comparative example 3. The result indicates that the pneumatic tire of the present invention can exhibit both of excellent snow performance and excellent dry performance.

On the other hand, the tires of all comparative examples 4 to 6 are inferior to the tire of the comparative example 3 with respect to either snow performance or dry performance. That is, the tires of the comparative examples 4, 6 are inferior to the comparative example 3 with respect to dry performance. The tire of the comparative example 5 in inferior to the tire of the comparative example 3 with respect to snow performance.

In the tire of the comparative example 4, all blocks are formed of a simple block respectively so that the tire has low rigidity. Accordingly, it is considered that the tire of the comparative example 4 exhibits poor dry performance. In the tire of the comparative example 6, some of blocks are formed of "composite blocks" so that the tire has higher dry performance than the tire of the comparative example 4. However, when compared with the tires of the examples 2 to 4, the tire of the comparative example 6 has lower dry performance. This is, in all tires of the examples 2 to 4, all blocks belonging to one row are formed of "composite blocks".

In the tire of the comparative example 5, although "shallow grooves" are formed on each rib ridge between each two adjacent main grooves of all main grooves, there is no block formed by dividing the row by lateral grooves and hence, it is considered that the tread surface has high rigidity and also high dry performance. On the other hand, snow performance of the tread surface is lowered by an amount corresponding to the non-presence of blocks formed by dividing the row. Accordingly, from a viewpoint of acquisition of both snow performance and dry performance, the tire of the comparative example 5 is inferior to the tires of the examples 2 to 4.

Fifth Embodiment

Referring to FIG. 13, a tread portion 2 of a tire 1 according to a fifth embodiment has the following two technical features compared with the tires of the second to fourth embodiments.

Figure 14A:
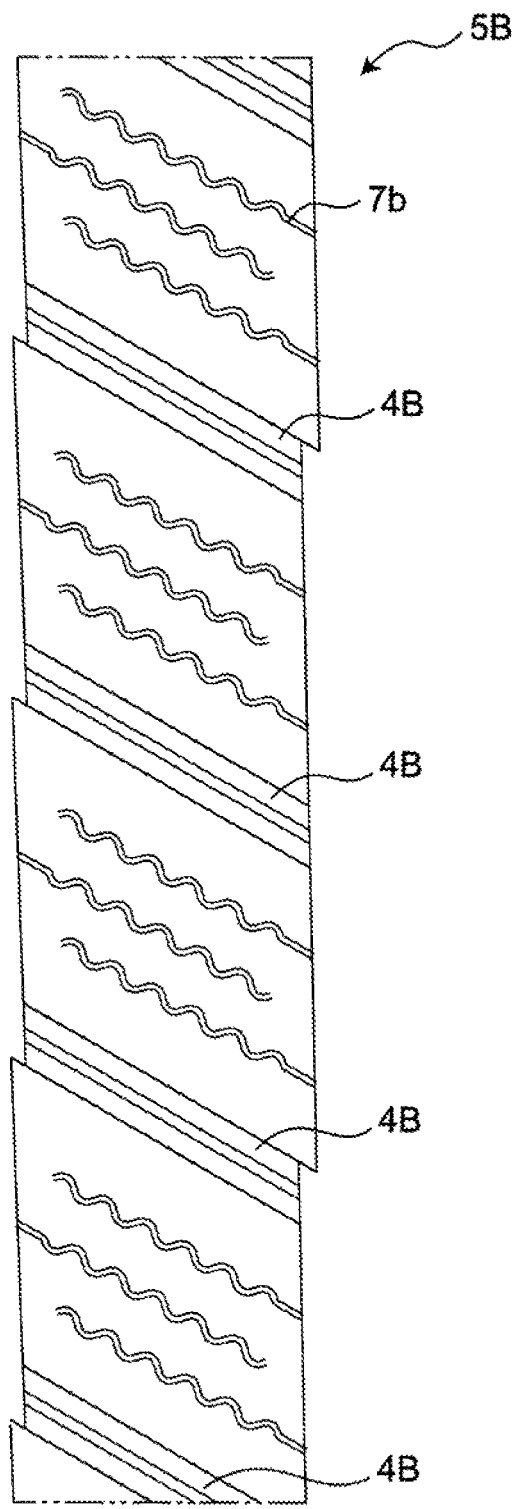
FIG. 14A is a partially enlarged view of FIG. 13.

The first technical feature lies in that lateral grooves 4B which are "shallow grooves with sipes" and sipes 7b are formed on an inner intermediate row 5B, but "deep grooves" are not formed on the inner intermediate row 5B (see also FIG. 14A). In other words, the inner intermediate row 5B is formed of a rib which is continuously formed without being divided by "deep grooves".

Figure 14B:
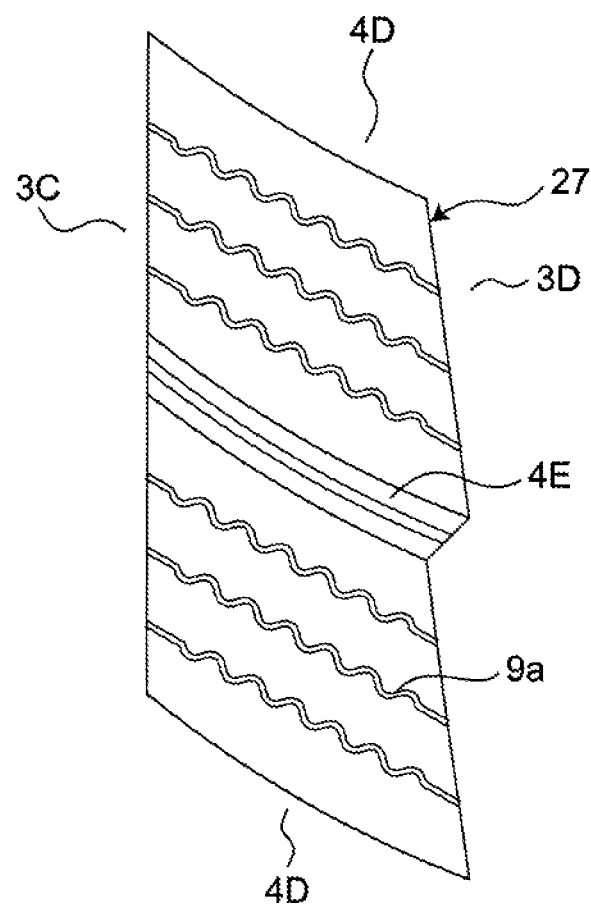
FIG. 14B is a partially enlarged view of FIG. 13.

A second technical feature lies in that, a lateral groove 4E which is "shallow groove with sipes" and a lateral groove 4D which is "deep groove" are alternately formed on an outer intermediate row 5D. In other words, the outer intermediate row 5D is formed of only composite blocks 27 arranged in a row in the tire circumferential direction (see also FIG. 14B). One lateral groove 4E which is "shallow groove with sipes" and a plurality of sipes 9a are formed on the individual composite block 27.

As other configurations, although lateral grooves 4A and lateral grooves 4F both of which are "deep grooves" are formed on an inner shoulder row 5A and an outer shoulder row 5E respectively, "shallow grooves with sipes" are not formed on the inner shoulder row 5A and the outer shoulder row 5E. Accordingly, the inner shoulder row 5A and the outer shoulder row 5E are formed of blocks 6 and blocks 10 both of which are not "composite blocks" respectively, and corrugated sipes 6a and corrugated sipes 10a are formed on the individual blocks 6 and the individual blocks 10 respectively. In the same manner as the inner intermediate row 5B, on the center row 5C, lateral grooves 4C which are formed of "shallow groove with sipes" are formed but "deep grooves" are not formed. The center row 5C is formed of a rib which continuously extends in the tire circumferential direction.

With respect to the first technical feature, in general, due to a camber angle of the tire 1 when the tire 1 is mounted on a vehicle, there is a tendency that a ground contact length becomes larger on an inner side portion of the tread portion 2 in the tire width direction than on an outer side portion of the tread portion 2 in the tire width direction. On the inner side portion in the tire width direction where the ground contact length becomes larger than that on the outer side portion, it is desirable that a highest priority be assigned to the acquisition of high rigidity. Accordingly, the inner intermediate row 5B is formed of a rib which is continuously formed over the whole circumference of the tire.

As a result of adopting the first technical feature, the outer intermediate row 5D is formed of composite blocks 27 which slightly lowers the rigidity thereof but can enhance snow performance by an amount corresponding to lowering of the rigidity as the second technical feature.

Sixth Embodiment

Figure 15:
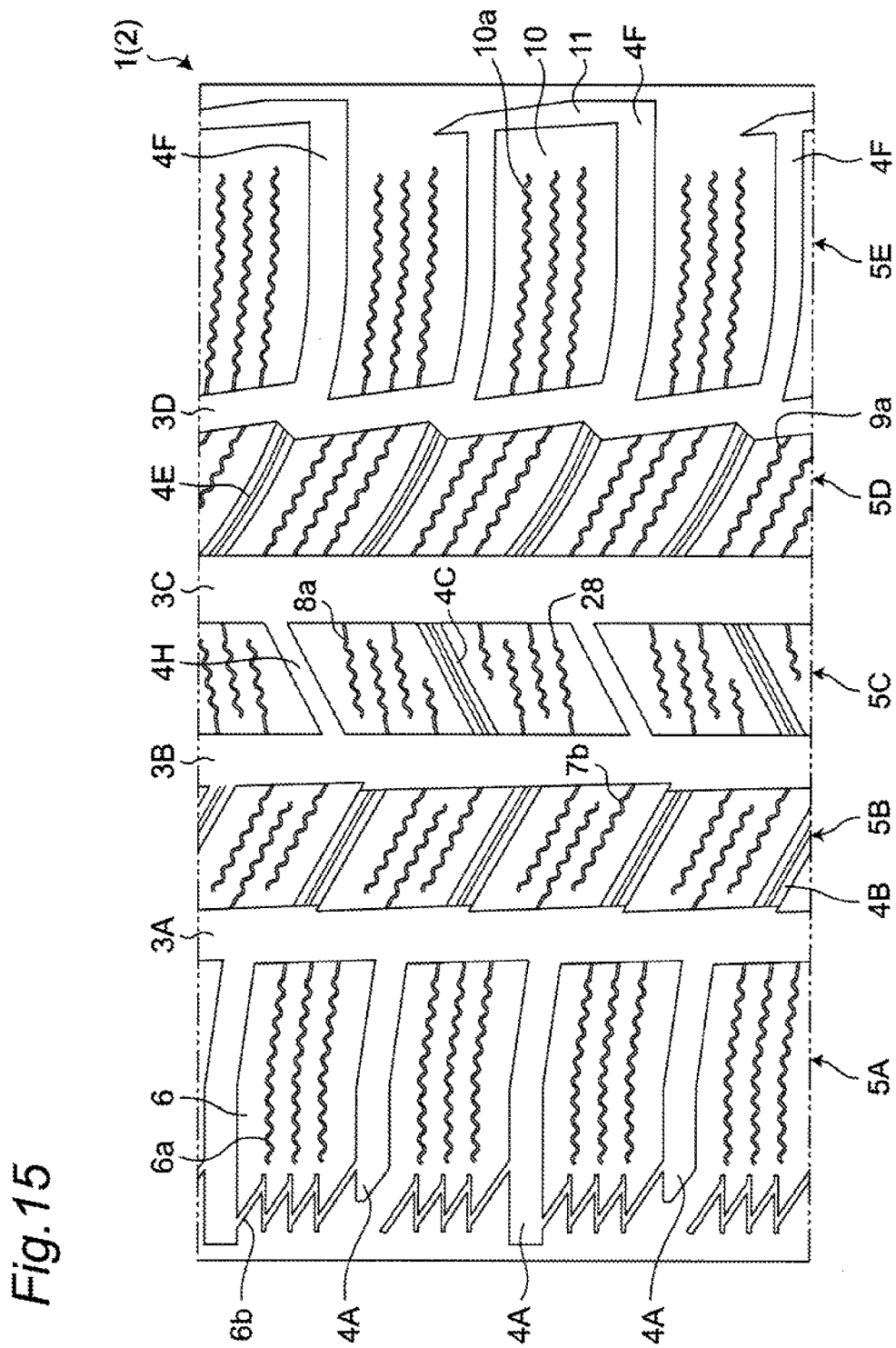
FIG. 15 is a developed view of a tread pattern of a tire according to a sixth embodiment of the present invention.

Referring to FIG. 15, a tread portion 2 of a tire 1 according to a sixth embodiment differs from the tread portion 2 of the tire 1 in the fifth embodiment only with respect to a point that the configuration of a center row 5C and the configuration of an outer intermediate row 5D are exchanged with each other.

To be more specific, in this embodiment, on a center row 5C, a lateral groove 4H which is "deep groove" and a lateral groove 4C which is "shallow groove with sipes" are alternately formed, and the center row 5C is formed of only composite blocks 28 (see also FIG. 16B), On the other hand, on an outer intermediate row 5D, lateral grooves 4E which are "shallow groove with sipes" and sipes 9a are formed but "deep grooves" are not formed. The outer intermediate row 5D is formed of a rib substantially equal to the rib which forms the center row 5C in the fifth embodiment (see also FIG. 16C).

Figure 16A:
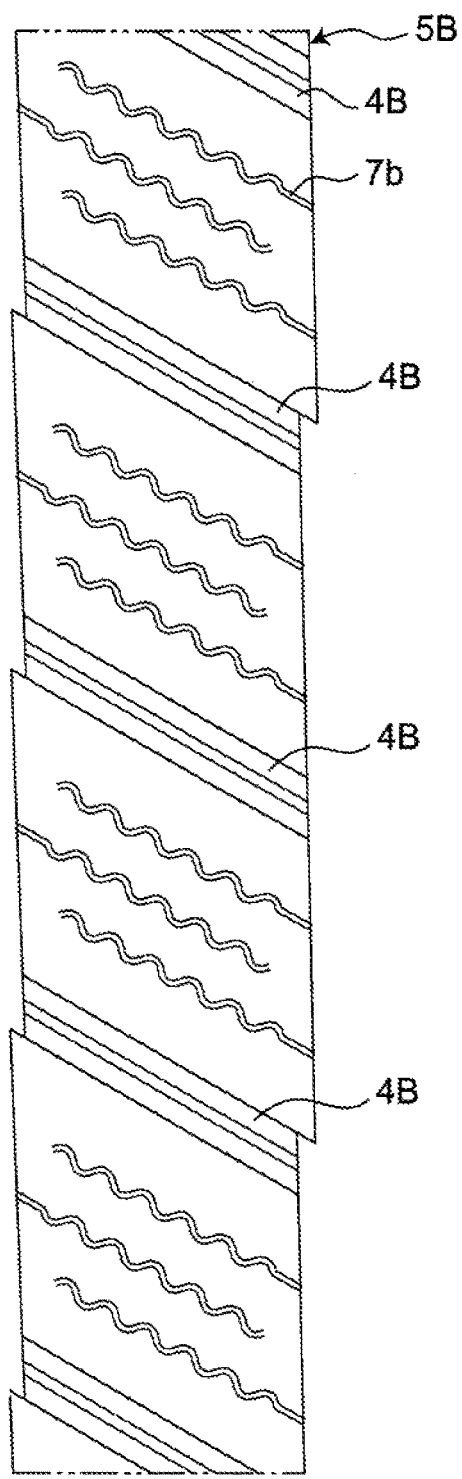
FIG. 16A is a partially enlarged view of FIG. 15.
Figure 16B:
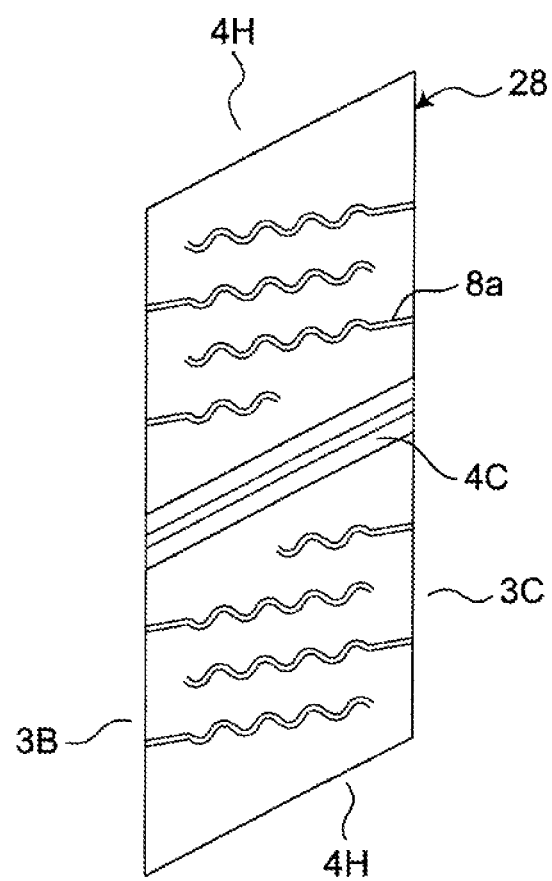
FIG. 16B is a partially enlarged view of FIG. 15.
Figure 16C:
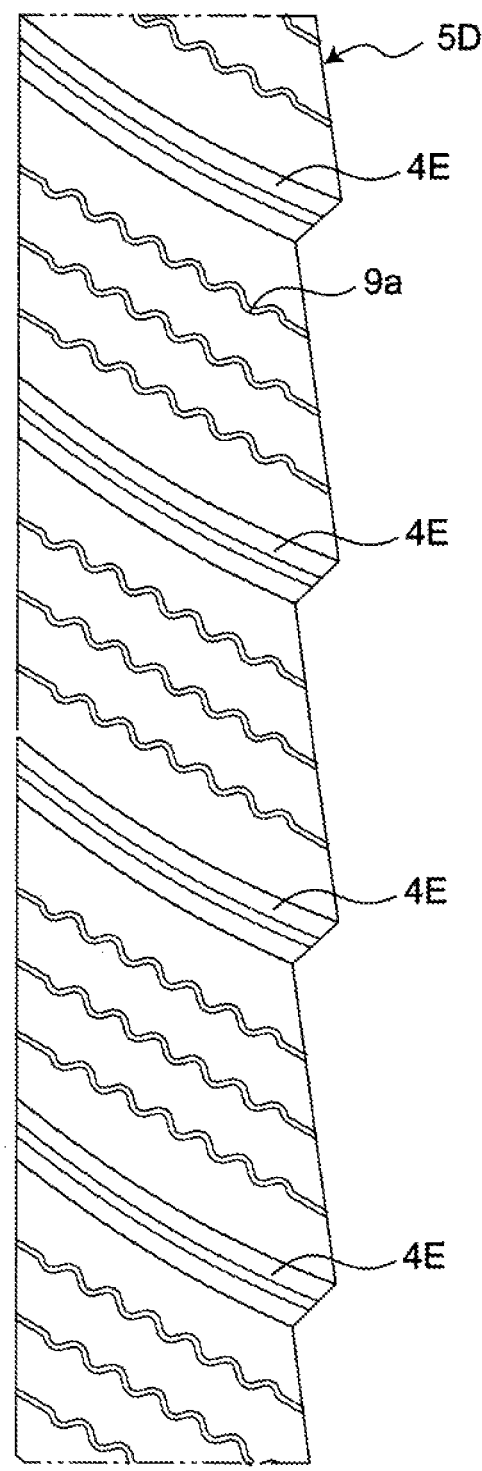
FIG. 16C is a partially enlarged view of FIG. 15.

In this embodiment, in the same manner as the fifth embodiment, the inner intermediate row 5B is also formed of a rib (see also FIG. 16A).

Seventh Embodiment

Figure 17:
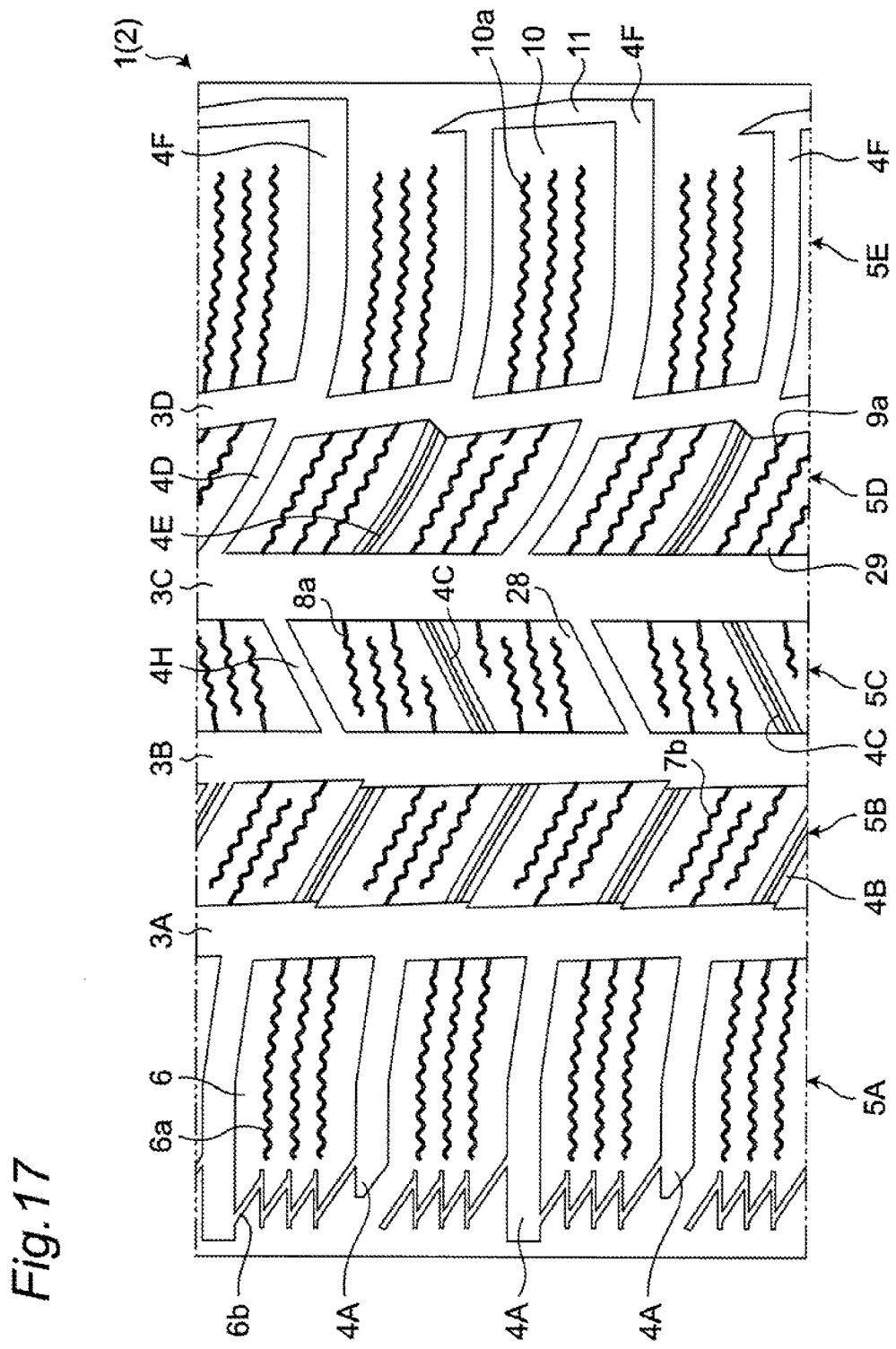
FIG. 17 is a developed view of a tread pattern of a tire according to a seventh embodiment of the present invention.
Figure 18A:
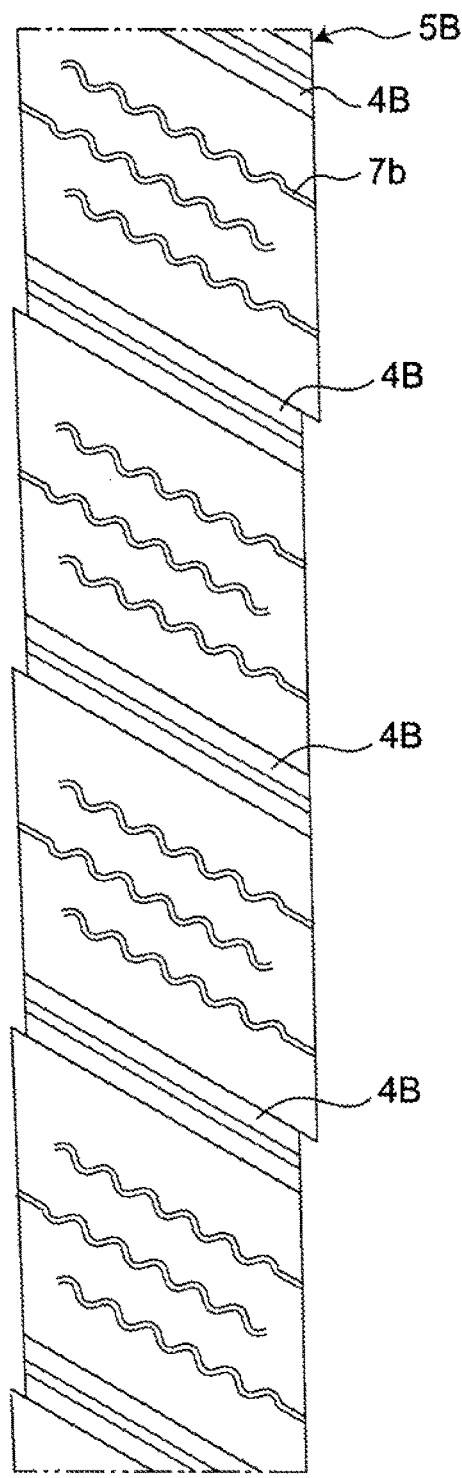
FIG. 18A is a partially enlarged view of FIG. 17.
Figure 18B:
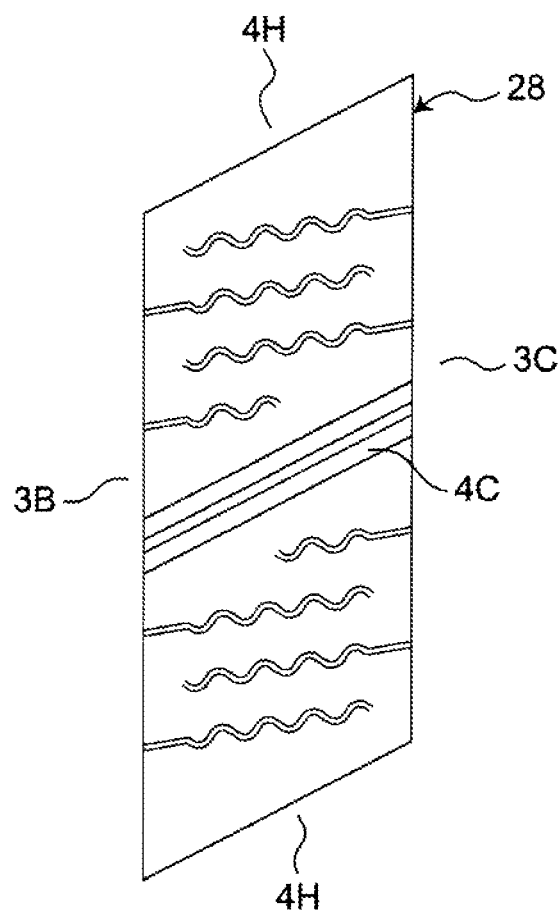
FIG. 18B is a partially enlarged view of FIG. 17.
Figure 18C:
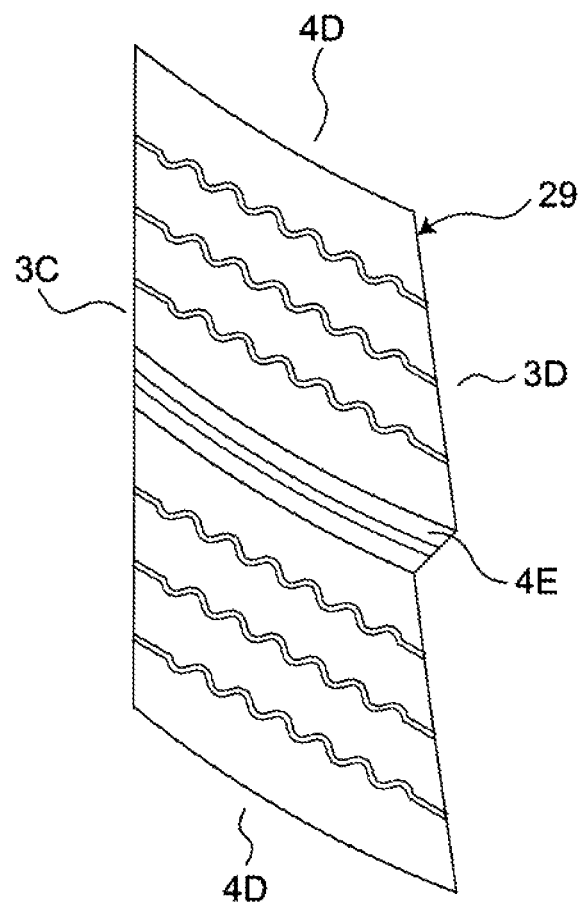
FIG. 18C is a partially enlarged view of FIG. 17.

Referring to FIG. 17 to FIG. 18C, a tread portion 2 of a tire 1 according to the seventh embodiment differs from the tread portions 2 of the tires 1 of the fifth and sixth embodiments with respect to a point that both a center row 5C and an outer intermediate row 5D are formed of only composite blocks 28, 29 respectively.

Other Modifications of Fifth to Seventh Embodiments

In the fifth to seventh embodiments, the tires have four main grooves. However, in the third aspect of the present invention, it is sufficient that the tire have at least three main grooves. When the tire has three main grooves, two rows of blocks or ribs are disposed between an inner shoulder row 5A and an outer shoulder row 5B. With respect to two rows, the rib which is positioned between a pair of (two) main grooves positioned on an inner side in a state where the tire is mounted on a vehicle is not divided into blocks by lateral grooves, and sipes are formed on a surface of the rib or shallow grooves with sipes which have the sipes on a groove bottom are formed on the rib. All blocks belonging to the row between outer main grooves are formed of "composite blocks".

When the tire has five or more main grooves, a rib positioned between a pair of (two) main grooves positioned on an innermost side in a state where the tire is mounted on the vehicle is not divided into blocks by lateral grooves, and sipes are formed on a surface of the rib or shallow grooves with sipes which have sipes on a groove bottom are formed on the rib. Further, in at least a region between other pair of inter main grooves, all block belonging to the region are formed of "composite blocks".

Evaluation Test 3

Figure 19:
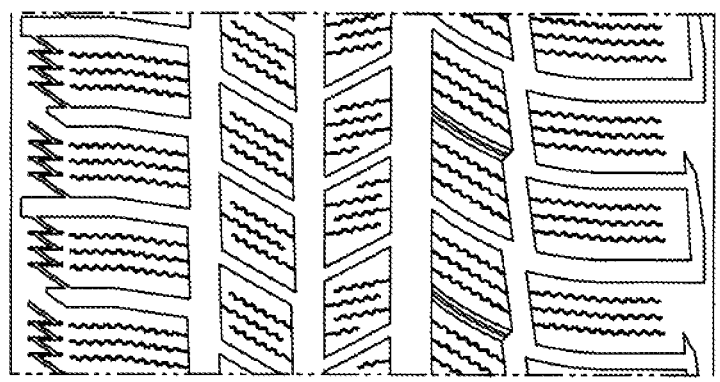
FIG. 19 is a developed view of a tread pattern of a tire according to a comparative example 7.

With respect to the tire of the comparative example 7 (FIG. 19) and the tires of the examples 8 to 10, evaluation tests (a snow performance test, a dry performance test, a dry braking test) were carried out. The tires of the examples 8 to 10 are respectively the tires of the fifth to seventh embodiments.

The tire of the comparative example 7 shares the same configuration with the tires of the examples 8 to 10 (fifth to seventh embodiments) with respect to a point that the tire has four main grooves. However, the tire of the comparative example 7 differs from the tires of the examples 8 to 10 with respect to the following points.

In the tire of the comparative example 7, with respect to all of four main grooves, a continuous rib is not formed in each region defined between two adjacent main grooves. In the tires of the examples 8 to 10 (fifth to seventh embodiments), at least the inner intermediate row 5B is formed of a rib. The rib is not divided into blocks by deep grooves, and sipes or shallow grooves with sipes are formed on a surface of the rib. By disposing such a rib on an inner side portion in the tire width direction which has a large ground contact length, dry performance and dry braking performance are enhanced. On the other hand, in the tire of the comparative example 7, a continuous rib ridge is disposed neither on an inner side portion in the tire width direction nor on other portions.

In this evaluation test, a tire size and a vehicle used are substantially equal to the tire size and the vehicle used in the above-mentioned "evaluation test 2". The contents of a snow performance test and the contents of a dry performance test are also substantially equal to the contents of the snow performance test and the contents of the dry performance test in the above-mentioned "evaluation test 2" (a result of the tire of the comparative example 7 being expressed as an index of 100).

In the dry braking test, the respective tires were mounted on a vehicle, and a braking distance required for stopping the vehicle after starting ABS braking at 100 km/h on a dry road surface was measured. The evaluation was made by expressing a result of the tire of the comparative example 7 as an index of 100. In Table 3, the larger the index, the more excellent dry braking performance the tire has.

TABLE 3

|  | Example 8 | Example 9 | Example 10 | Comparative Example 7 |
|---|---|---|---|---|
| Snow performance | 100 | 100 | 104 | 100 |
| Dry performance | 104 | 104 | 103 | 100 |
| Dry braking performance | 106 | 106 | 103 | 100 |

When attention is paid to dry performance and dry braking performance, in all tires of the examples 8 to 10, with respect to the inner side portion in the tire width direction where a ground contact length in the tire circumferential direction becomes the longest when a camber angle is taken into consideration, the inner intermediate row 5B is formed of a rib. The rib is not divided into blocks by "deep grooves", and sipes or shallow grooves with sipes are formed on a surface of the rib and hence, the rib has high rigidity. Further, the sipes or the shallow grooves with sipes formed on the surface of the rib can increase a gripping force. That is, by forming the rib ridge having high rigidity and high gripping force on the inner side portion in the tire width direction where the ground contact length is large, the pneumatic tire can acquire high motion performance and braking performance on a dry road surface.

On the other hand, the tire of the comparative example 7 has the configuration where the inner intermediate row 5B on the inner side portion in the tire width direction is formed of blocks having high independence each of which is divided by lateral grooves. Accordingly, it is considered that dry performance and dry braking performance of the tire of the comparative example 7 are inferior to those of the tires of the examples 8 to 10.

In the tires of the examples 8, 9, two rows of continuous ribs are formed and hence, it is considered that the tires of the examples 8, 9 have high dry performance and high dry braking performance compared with the tire of the example 10 where only one row of rib is formed due to such difference in the number of rows of continuous ribs.

When attention is paid to snow performance, in the tire of the example 10, both the center row 5C and the outer intermediate row 5D are formed of the composite blocks 28, 29. On the other hand, in the tires of the examples 8, 9 and the tire of the comparative example 7, only either of the center row 5C or the outer intermediate row 5D is formed of the composite blocks so that the number of composite blocks is smaller than the number of composite blocks in the tire of the example 10. Accordingly, it is considered that snow performance of the tires of the examples 8, 9 and the tire of the comparative example 7 is inferior to snow performance of the tire of the example 10.

As described previously, "composite blocks" have an advantageous effect of allowing a tire to exhibit both excellent snow performance and excellent dry performance. In the tires of the examples 8, 9 having the relatively small number of "composite blocks", it is considered that the advantageous effect of enhancing dry performance due to "composite blocks" is lowered by an amount corresponding to the number of "composite blocks". However, it is considered that, in the tires of the examples 8, 9, the ribs are formed in two rows and hence, dry performance is enhanced. As a result, dry performance of the tires of the examples 8, 9 as a whole is superior to dry performance of the tire of the comparative example 7.

In the tires of the examples 8 to 10, both "corrugated sipes" d "shallow grooves with sipes" are formed on a surface of the rib ridge. However, it is estimated that substantially the same advantageous effects can be acquired even when only one of "corrugated sipes" and "shallow grooves with sipes" are formed on the surface of the rib ridge, or even when straight sipes are formed on the surface of the rib ridge in place of the corrugated sipes.

What is claimed is:

1. A pneumatic tire comprising:
    four main grooves formed on a tread portion such that the four main grooves extend in a tire circumferential direction;
    a plurality of lateral grooves formed on the tread portion; and
    five block rows each including a plurality of blocks defined respectively by the main grooves and a pair of the lateral grooves disposed adjacently to each other in the tire circumferential direction, the blocks arranged in a row in the tire circumferential direction,
    wherein a mounting posture of a pneumatic tire with respect to a vehicle body in a tire width direction is designated,
    wherein the main grooves comprise:
    an inner main groove positioned on an innermost side in the tire width direction in a state where the tire is mounted on the vehicle;
    an outer main groove positioned on an outermost side in the tire width direction in a state where the tire is mounted on the vehicle;
    a first center main groove disposed adjacently to an outer side of the inner main groove in the tire width direction; and
    a second center main groove disposed adjacently to an inner side of the outer main groove in the tire width direction,
    wherein the block rows comprise:
    an inner shoulder row positioned inside the inner main groove in the tire width direction;
    an outer shoulder row positioned outside the outer main groove in the tire width direction;
    an inner intermediate row positioned between the inner main groove and the first center main groove;
    an outer intermediate row positioned between the outer main groove and the second center main groove; and
    a center row positioned between the first center main groove and the second center main groove,
    wherein a groove width of the first center main groove and a groove width of the second center main groove is larger than a groove width of the inner main groove and a groove width of the outer main groove,
    wherein the lateral groove includes a plurality of first lateral grooves formed at intervals in the tire circumferential direction so as to define blocks belonging to the inner shoulder row,
    wherein a first raised portion which connects the pair of blocks belonging to the inner shoulder row to each other is formed in the first lateral grooves every one other on an inner main groove side, and a depth of the first lateral groove in the first raised portion is smaller than a depth of the first lateral groove in other portions,
    wherein a second raised portion is formed on the outer main groove in a region defined by an imaginary line which connects the block belonging to the outer intermediate row and the block belonging to the outer shoulder row, and a depth of the outer main groove in the second raised portion is smaller than a depth of the outer main groove in other portions, and wherein the depth of the first lateral groove in the first raised portion is set to 0.4 to 0.6 times inclusive as large as the depth of the first lateral groove in other portions.

2. The pneumatic tire according to claim 1, wherein the depth of the outer main groove in the second raised portion is set 0.5 to 0.7 times inclusive as large as the depth of the outer main groove in other portions.

3. The pneumatic tire according to claim 1, wherein the lateral groove includes a plurality of second lateral grooves which are formed at intervals in the tire width direction so as to define the blocks belonging to the outer shoulder row, and wherein the second lateral groove extends in the tire width direction beyond an outer ground contact edge of the tread portion in the tire width direction.

4. The pneumatic tire according to claim 3, wherein the lateral groove includes a plurality of third lateral grooves which are formed at intervals in the tire width direction so as to define the blocks belonging to the outer intermediate row, and wherein the second lateral groove and the third lateral groove are arranged in a state where the second lateral groove and the third lateral groove are positionally aligned with each other so as to communicate with each other from the second center main groove to the outer ground contact edge in the tire width direction.

5. The pneumatic tire according to claim 1, wherein a plurality of first slits which are arranged in a staggered manner in the tire circumferential direction are formed on the block belonging to the inner shoulder row.

6. The pneumatic tire according to claim 1, wherein a plurality of second slits which communicates with each other in the tire circumferential direction are formed in the block belonging to the outer shoulder row.

7. The pneumatic tire according to claim 1, wherein the first raised portion is elongated in the tire width direction so as to terminate without entering the inner main groove.

* * * * *